United States Patent [19]

Hanson et al.

[11] Patent Number: 5,140,826
[45] Date of Patent: Aug. 25, 1992

[54] METHOD OF OPERATING A TRANSPORT REFRIGERATION UNIT

[75] Inventors: Jay L. Hanson, Bloomington; Leland L. Howland, Belle Plaine, both of Minn.

[73] Assignee: Thermo King Corporation, Minneapolis, Minn.

[21] Appl. No.: 728,665

[22] Filed: Jul. 11, 1991

[51] Int. Cl.⁵ ............................................ F02N 17/02
[52] U.S. Cl. ........................................ 62/115; 62/126; 62/228.3; 123/142.5 R; 73/117.2
[58] Field of Search ........ 123/179.6, 179.21, 142.5 R, 123/142.5 E; 62/228.3, 323.1, 230, 115, 126, 217; 73/117.2

[56] References Cited

U.S. PATENT DOCUMENTS

| | | | |
|---|---|---|---|
| 4,050,297 | 9/1977 | Pettingell et al. | 73/117.2 |
| 4,419,866 | 12/1983 | Howland | 62/228.4 |
| 4,663,725 | 5/1987 | Truckenbrod et al. | 364/505 |
| 4,878,465 | 11/1989 | Hanson et al. | 123/179.6 |
| 4,918,932 | 4/1990 | Gustafson et al. | 62/89 |
| 4,977,751 | 12/1990 | Hanson | 62/217 X |
| 4,977,752 | 12/1990 | Hanson | 62/213 X |
| 5,063,513 | 11/1991 | Shank et al. | 123/142.5 R |

Primary Examiner—William E. Wayner
Attorney, Agent, or Firm—D. R. Lackey

[57] ABSTRACT

A method of operating a transport refrigeration system having a refrigerant compressor driven by an internal combustion engine. Microprocessor based electrical control maintains the temperature of a conditioned space at a desired set point via heating, cooling and null cycles, with the engine being started and stopped, as required. During the engine starting process, a suction line modulation valve, if used, is closed, engine pre-heat time is selected, including using engine temperature to access a look-up table, and current draw is checked during pre-heat. Excessive current terminates pre-heat. Control diagnostics checks the voltage level on both sides of a refrigerant high pressure switch, before initiating engine cranking. Prior to stopping the engine, a control option initiates a heating cycle for a short time when null is being entered from a cooling cycle, to warm the evaporator and prevent premature starting of the engine.

20 Claims, 17 Drawing Sheets

METHOD OF OPERATING A TRANSPORT REFRIGERATION UNIT

TECHNICAL FIELD

The invention relates in general to transport refrigeration units, and more specifically to transport refrigeration units which have a compressor prime mover which includes an internal combustion engine operable in a cycling or on-off mode.

BACKGROUND ART

U.S. Pat. No. 4,419,866, which is assigned to the same assignee as the present application, discloses a transport refrigeration system in which a Diesel engine which drives a refrigerant compressor may be selectively operated in either a continuous or a start-stop mode. In the start-stop mode, the Diesel engine is under the control of a refrigeration thermostat, being stopped and restarted as the temperature of a controlled space enters and leaves predefined temperature bands relative to a selected temperature set point.

U.S. Pat. No. 4,878,465, which is also assigned to the same assignee as the present application, discloses improved electrical control for automatically starting a Diesel engine, which simplified the control and improved the logic of the '866 patent. A thermistor in the engine coolant controls the engine pre-heat time. A battery monitor control module determines if the battery charge condition is at a level sufficient to permit the engine to stop. An electronic temperature control module or thermostat control the temperature of the served space, similar to the '866 patent.

While the systems of the '866 and '465 patents perform well, it would be desirable, and it is an object of the present invention, to integrate and consolidate all of the functions of the separate control modules into one controlling function, such as provided by a computer, and more specifically a microprocessor, while further enhancing and improving the control of a transport refrigeration unit.

U.S. Pat. Nos. 4,663,725 and 4,918,932, which are assigned to the same assignee as the present application, disclose the use of microprocessor based refrigeration control for use with transport refrigeration systems, with the controlling functions being related to aspects of such systems other than the prime mover.

SUMMARY OF THE INVENTION

Briefly, the present invention is a method of operating a transport refrigeration unit with microprocessor based electrical control, for controlling the temperature of a conditioned space via selectable continuous and start-stop modes. The continuous mode controls temperature in the served space via heating and cooling cycles, and the start-stop mode controls temperature in the served space via heating, cooling and null cycles.

The transport refrigeration unit includes a refrigerant compressor connected in a closed refrigerant circuit which also includes a condenser, and an evaporator. A controllable suction line modulation valve may optionally be provided in a suction line between the evaporator and compressor. The prime mover arrangement for the compressor includes an internal combustion engine, such as a Diesel engine, and the drive arrangement may optionally include a stand-by electric motor for driving the compressor when the associated container, truck or trailer is stationary and located near a source of electrical potential.

Each time the Diesel engine is started, the microprocessor checks to see if the unit will be operating with a controllable suction line valve, and if so, the suction line valve is closed before the engine is cranked to reduce the compressor load on the engine during starting.

Each time the Diesel engine is started, the microprocessor checks the value of a sensor disposed to measure the temperature of the Diesel engine coolant. The microprocessor compares the value with a pre-stored plausible range of values for this sensor. If the sensor value is outside the plausible range, the microprocessor automatically assigns a predetermined maximum pre-heat time and an alarm is set which will indicate to the operator and/or service personnel that the coolant sensor is faulty. If the sensor value is within the plausible range, the value is used to access a pre-stored look-up table to obtain the correct pre-heat time for the engine The look-up table may include maximum and minimum times for temperatures beyond a predetermined temperature range, or the microprocessor may preliminarily compare the sensor value to the predetermined temperature range and automatically assign the maximum pre-heat time or the minimum pre-heat time, as required, using the look-up table only for sensor values within the predetermined temperature range.

After the engine pre-heat time has been determined, the microprocessor initiates engine pre-heat by energizing electrical glow plugs. After a short period of time selected to enable the glow plug current to stabilize, the microcomputer checks the voltage across a DC shunt in the system battery circuit to determine if the glow plug current is in a proper predetermined range. If it is not in the desired range, an appropriate alarm is set, and the microprocessor then determines if the current draw is too high to permit pre-heat to continue. If the current draw exceeds a predetermined maximum allowable value, the pre-heat time is set "elapsed", and the engine starting process is continued, to attempt an engine start without completing the selected pre-heat time The microprocessor then enables a circuit which includes a relay RUN, which establishes a control circuit which includes a fuel solenoid and a high pressure cutout. The high pressure cut-out is disposed to monitor refrigerant pressure in the high pressure side of the refrigerant circuit, such as near the condenser. Instead of merely monitoring the cut-out switch to see if it is closed or open, the microprocessor checks the voltage level on each side of the switch. If voltage is detected on only one side of the switch, an alarm is set which indicates high refrigerant pressure. If voltage is detected on neither side of the switch, an alarm is set which indicates failure of the relay RUN. If either alarm is set, the engine starting process is terminated.

If the voltage level check on both sides of the high pressure cut-out switch indicates no refrigerant pressure problem and no problem with the relay RUN, the microprocessor initiates the cranking of the engine The microprocessor then logically combines time, engine speed, oil pressure, and polarity of the current flow relative to the battery to determine whether the engine has started, and to generate various fault codes when a problem is encountered. The microprocessor detects the failure of the engine speed to reach a first predetermined value within a first predetermined period of time, and in response to such detection:

1) a first alarm is set which indicates failure of the engine to crank when an oil pressure sensor switch indicates low oil pressure and the polarity of the DC shunt voltage indicates the battery is not being charged; or 2) a second alarm is set which indicates failure of the oil pressure sensor switch when the oil pressure sensor switch indicates low oil pressure and the polarity of the DC shunt voltage indicates the battery is being charged; or 3) a third alarm is set which indicates failure of the engine speed sensor when the oil pressure sensor switch indicates the oil pressure is not low and the polarity of the DC shunt voltage indicates the battery is being charged.

If the engine speed reaches the first predetermined value within the first predetermined period of time, the process is repeated relative to a second engine speed and a second predetermined period of time, setting alarms similar to those just described when the engine speed fails to reach the requisite speed within the requisite time. The first alarm is coded to indicate "failure to start", rather than "failure to crank", since the engine did meet the first speed-time test, and obviously the engine did crank.

In a selectable option, before the microprocessor shuts the engine down to enter a null condition during which the served space requires neither cooling or heating to satisfy the selected set point temperature, the microprocessor determines if the null condition will be entered from a cooling cycle or from a heating cycle. If the null condition will be entered from a cooling cycle, the microprocessor switches the transport refrigeration unit to a heating cycle just before stopping the engine, for a period of time selected to just warm the evaporator coil. This feature prevents premature starting of the engine due to the cold surface of the evaporator coil cooling a load space temperature sensor, which would unnecessarily result in the control system re-starting the engine to provide heat to the served space.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
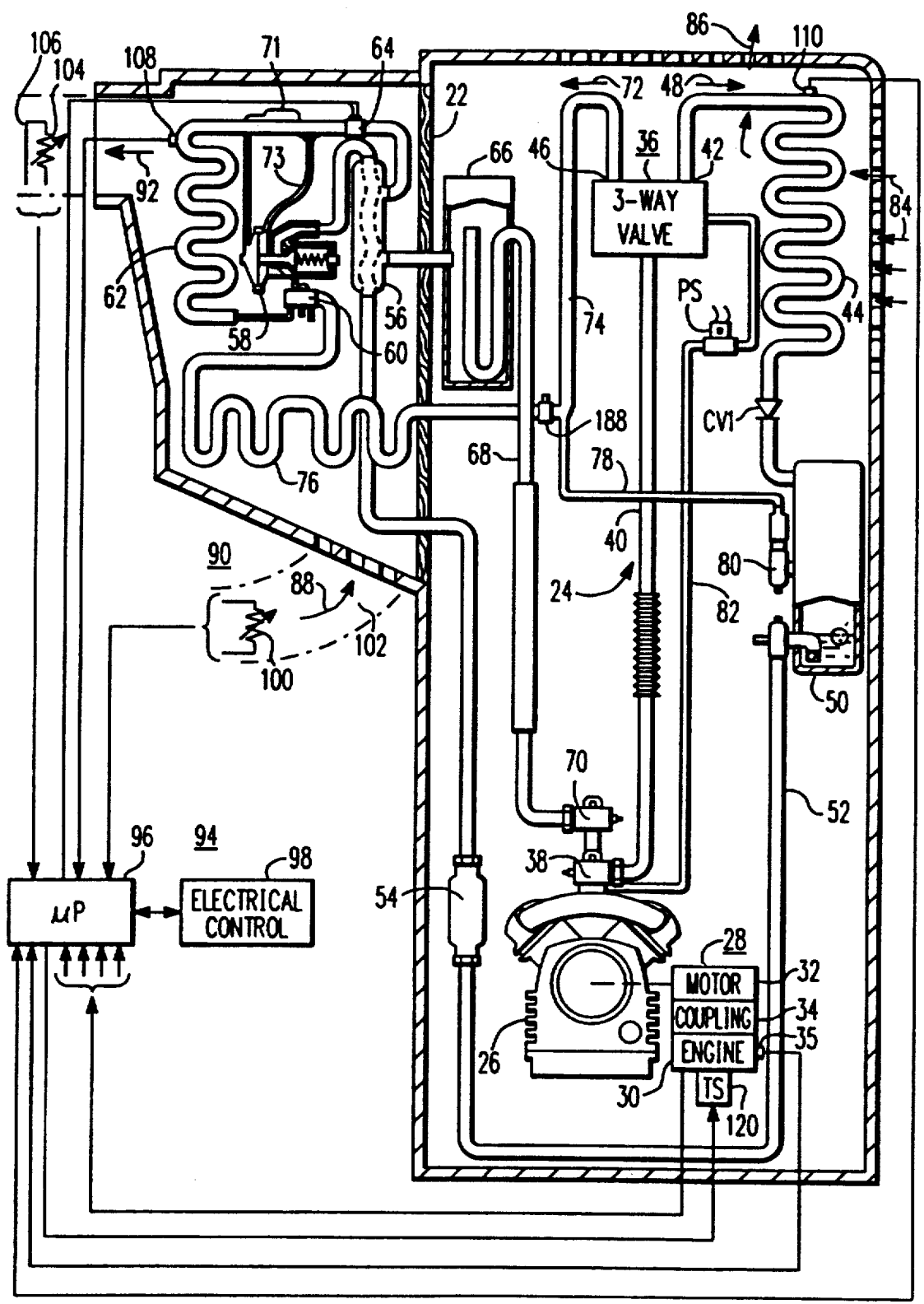
FIG. 1 is a partially block and partially schematic diagram of a refrigeration system which may be controlled by the methods of the invention.

Referring now to the drawing, and to FIG. 1 in particular, there is shown a transport refrigeration unit 20 which may be controlled according to the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects the desired prime mover.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described Expansion valve 58 is controlled by a thermal bulb 71 and an equalizer line 73.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is deenergized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air" is returned to the space 90. During an evaporator defrost cycle, the evaporator fan or blower is not operated, and a defrost air damper may be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor or high pressure cut-out (HPCO) 110 disposed on the high side of the refrigerant circuit 48, and from various engine sensors shown in FIG. 2B, such as oil level sensor 112 , oil pressure sensor 114, engine coolant temperature sensor 116, and engine speed sensor 118.

Figure 2A:
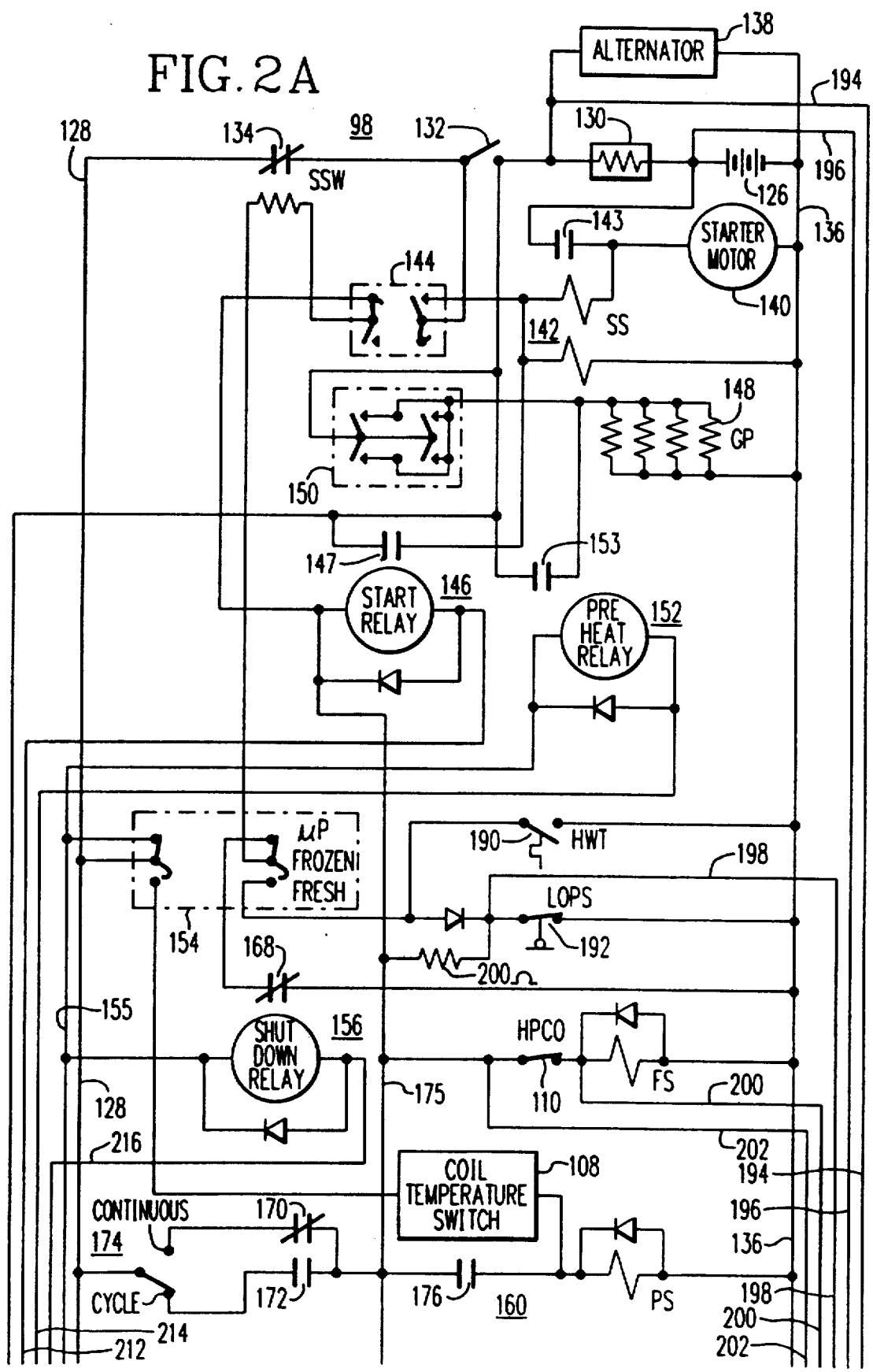
FIGS. 2A and 2B may be assembled to provide an electrical schematic diagram which implements the methods of the invention.
Figure 2B:
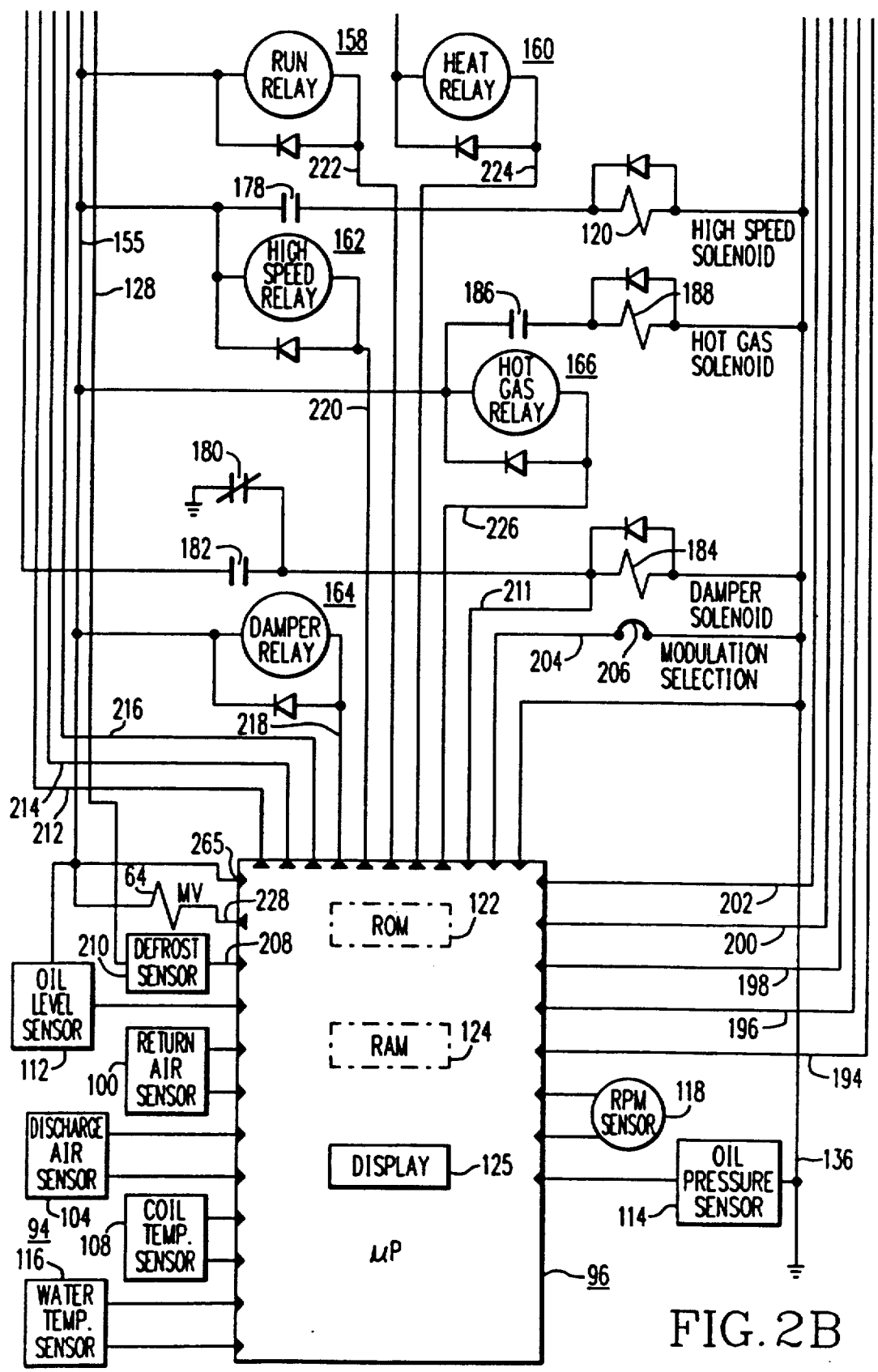

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs Microprocessor 96 also has a display 125 for displaying fault codes, indicator lights, and the like.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has a set of normally open contacts 153.

Control 98 also includes a three-position switch 154 having two banks of three terminals The three terminals, referring to their positions in FIG. 2A, include a center terminal, an upper terminal, and a lower terminal. Switch 154, in the illustrated upper position which connects the center terminal to the upper terminal in each bank, places unit 20 under control of the microprocessor 96. The upper position provides voltage from conductor 128 to a conductor 155.

An intermediate position of switch 154, in which the center terminal is not connected to either the upper or lower terminals, is selected when the microprocessor 96 is not utilized and the load in the conditioned space 90 is frozen. This switch position will cause unit 20 to operate continuously in a low speed cool mode.

The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35 degrees F., to energize the pilot solenoid PS and initiate a heating cycle, and to open at a predetermined higher temperature, such as 38 degrees F., to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156, which has a set of normally closed contacts 168, is normally energized. Shutdown relay 156 is de-energized to shut unit 10 down via its contacts 168 which close to ground the protective switch SSW and cause it to open its contacts 134.

The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode which includes starting and stopping the prime mover 28. The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Hot gas relay 166 is provided for controlling the hot gas solenoid valve 77 via a set of normally open contacts 186, when a hot gas solenoid valve 77 is provided in hot gas line 74.

Control 98 also includes an engine coolant temperature switch (high water temperature- HWT) 190, which closes upon an excessive engine temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, ie., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

Figure 3:
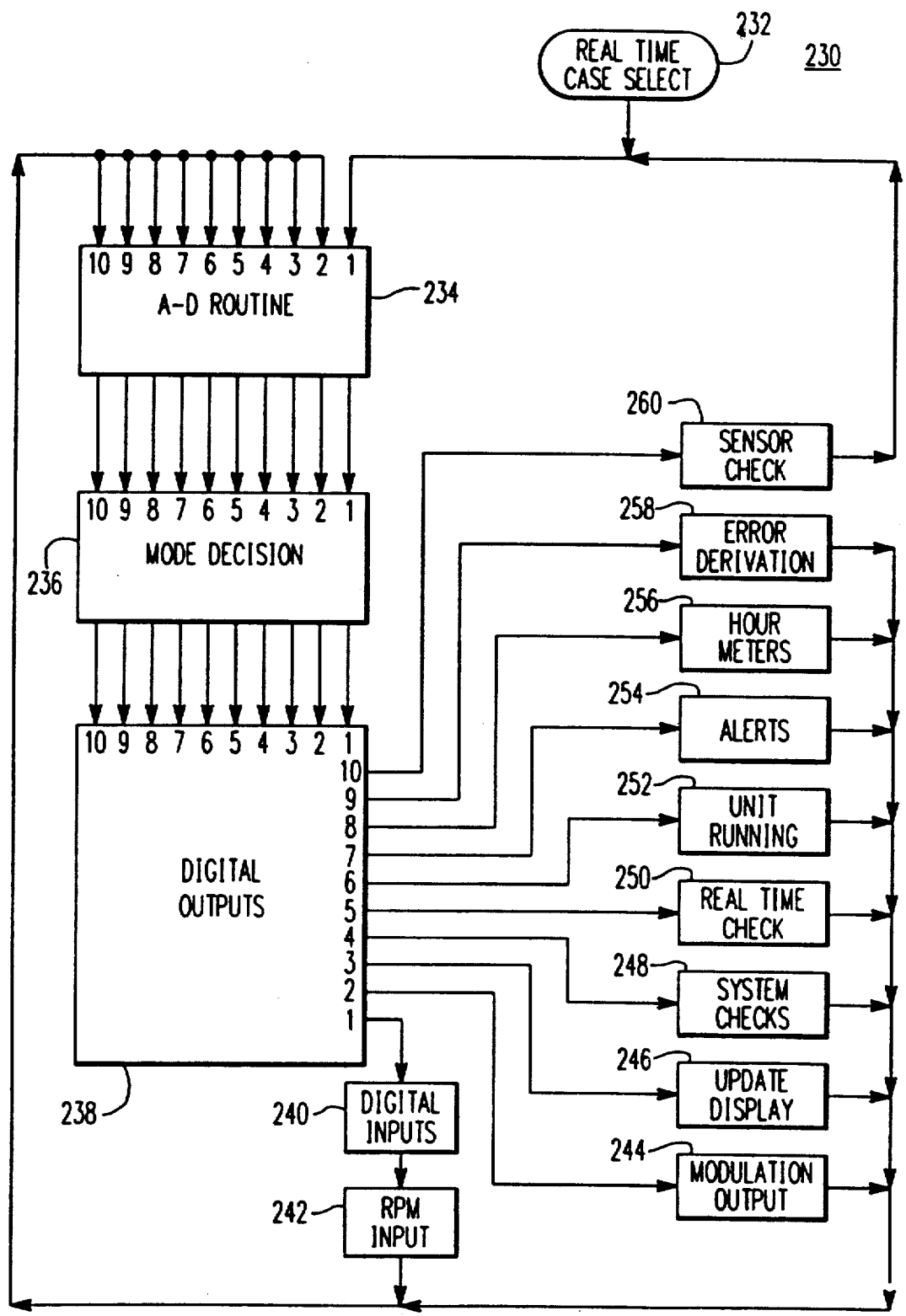
FIG. 3 is a block diagram of a time driven "real time case select" function performed by the microprocessor shown in FIGS. 1 and 2.

Microprocessor 96 is time driven, with a "real time case select" function 230, shown in FIG. 3, being repeated continuously. As the microprocessor functions are described, only those necessary to understanding the invention will be described in detail. Certain of the functions shown in block form, may be described in detail and claimed in concurrently filed application Ser. Nos. 07/728,464; 07/728,463; 07/778,477.

Function 230 is entered at 232 and step 234 performs analog to digital conversions of the analog inputs from various analog sensors. Step 236 performs a mode decision function which will be hereinafter described relative to FIG. 4. Step 238 takes care of providing the necessary digital signals which control various functions of unit 20, step 240 receives digital inputs from various sensed functions, and step 242 receives the engine speed input from RPM sensor 118. The program then returns to step 234 and upon reaching step 238 during the second pass, the program goes to step 244 which takes care of setting the proper current level in the modulation valve 64. Steps 234, 236 and 238 are then repeated, adding step 246 on the third pass, which updates microprocessor display 125, such as status displays, as well as displays which set forth any alarm codes which may have been set. Step 248 is added on the fourth pass, which performs certain system checks, step 250 is added on the fifth pass, which performs certain real time checks, step 252 is added on the sixth pass, which performs a unit running check, step 254 is added on the seventh pass, which performs certain alert or alarm functions, step 256 is added on the eight pass, which performs certain timing functions, step 258 is added on the ninth pass, which performs an error deviation function, and step 260 is added on a tenth pass, which checks the sensors for failure. Program 230 then repeats.

Figure 4:
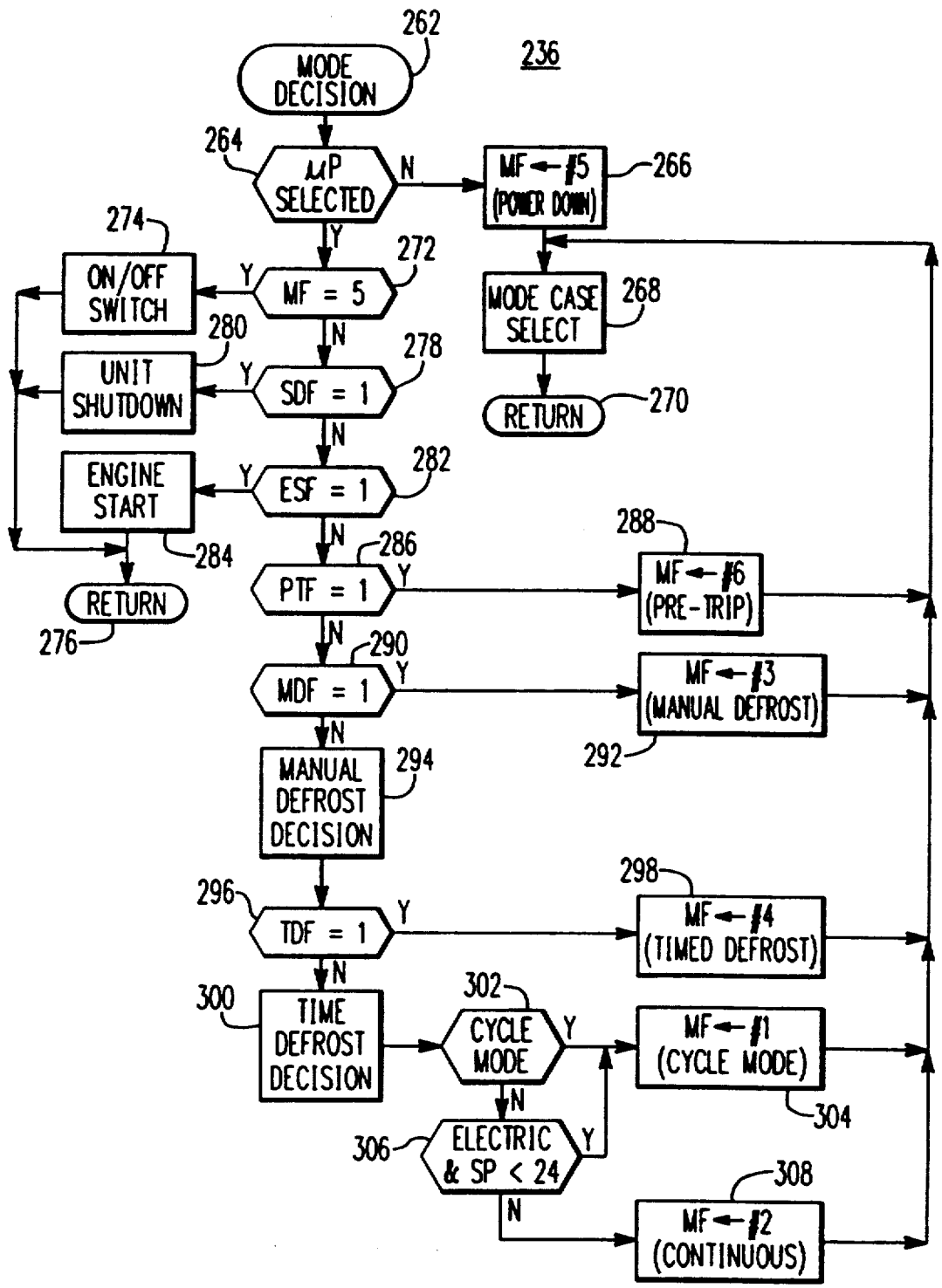
FIG. 4 is a flow chart illustrating a "mode decision" function performed by the microprocessor.

The mode decision program function 236, shown in FIG. 4, is entered at 262 and step 264 checks to see if microprocessor control has been selected via the three position selector switch 154. If it has been selected, an input 265 on microprocessor 96 will be high. If microprocessor control has not been selected, step 266 sets a mode flag MF to "5", signifying a power down mode for microprocessor 96. The microprocessor then executes a mode case select function 268, shown in detail in FIG. 5, and the program exits at 270. If step 264 finds that microprocessor control has been selected, step 272 checks to see if flag MF has been set to #5, signifying the power-down mode. If flag MF is set to #5, step 274 executes an on/off switch routine, and the program exits at 276. If flag MF is not set to #5, the program checks a shutdown flag SDF to see if it is true, which would indicate that some other program has requested that unit 20 be shut down. If shut down flag SDF is true, step 280 executes a unit shut down sequence, and the program exits at 276.

Figure 6A:
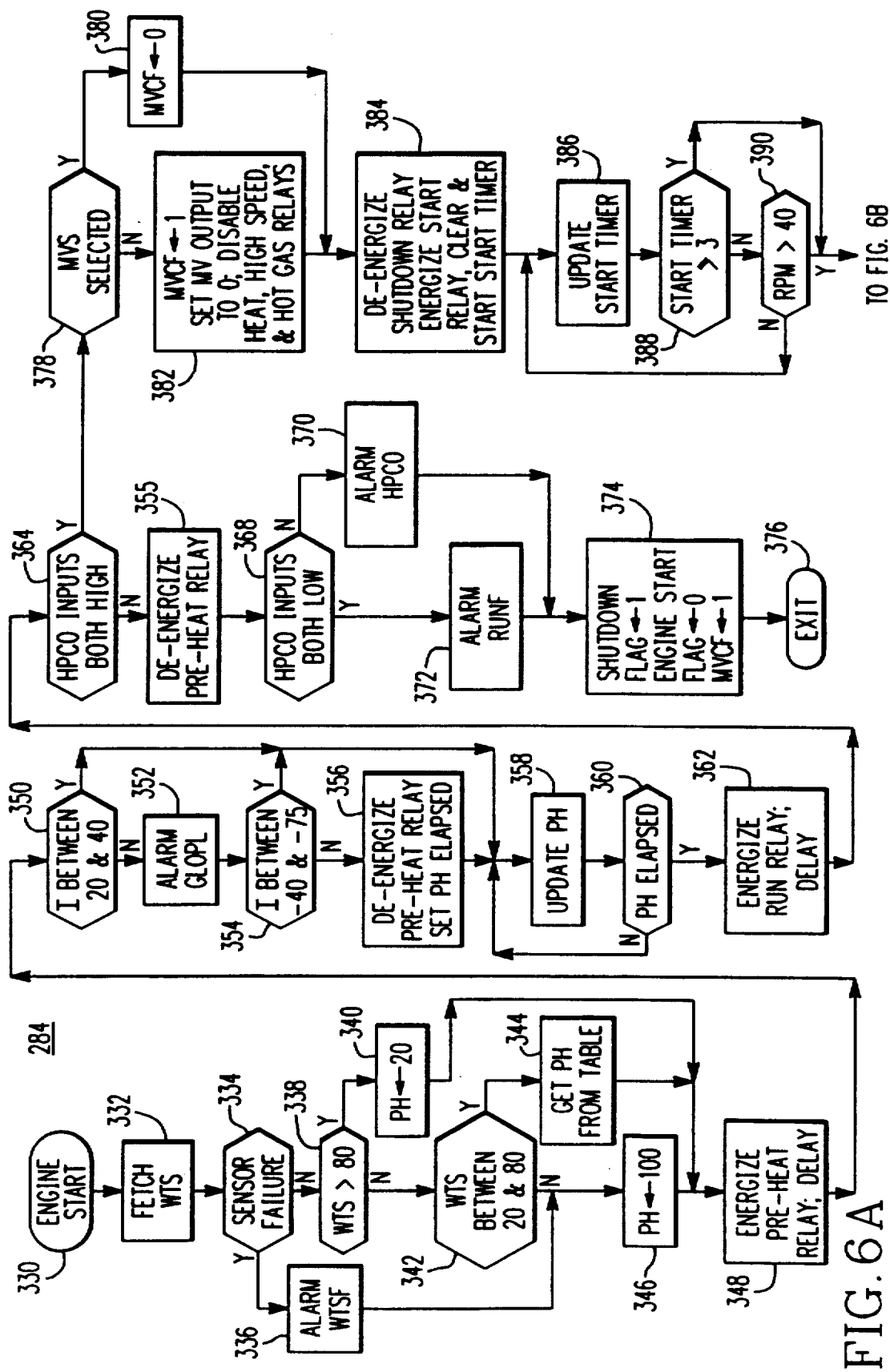
FIGS. 6A and 6B may be assembled to provide a flow chart of an engine start function which sets forth some of the methods of the invention.
Figure 6B:
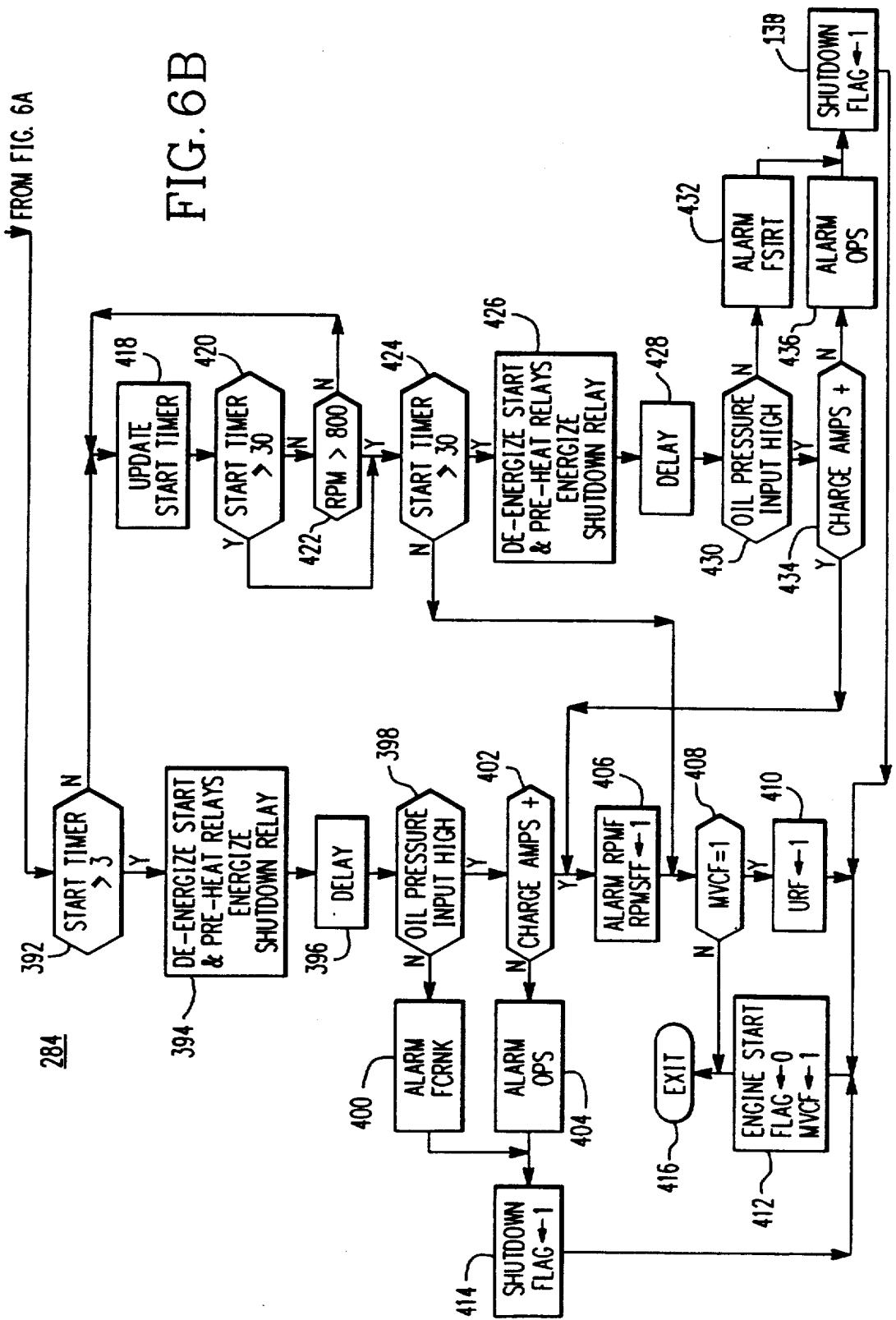

If shut down flag SDF is not true, step 282 checks to see if an engine start flag ESF is true, and if it is, step 284 executes a Diesel engine start routine, shown in detail in FIGS. 6A and 6B, and the program exits at 276.

If flag ESF is not true, step 286 checks a pretrip flag PTF to see if a pre-trip operation has been requested. The pre-trip operation causes a plurality of system self checks to be made to determine if the unit is ready for operation. If the flag PTF is true, step 288 sets mode flag MF to #6, indicating that the pre-trip routine should be performed.

If flag PTF is not true, step 290 checks a manual defrost flag MDF to see if it is true, and if it is, step 292 sets mode flag MF to #3, requesting defrost. If flag MDF is not true, step 294 performs a manual defrost decision block, which could result in the setting of flag MDF for detection on the next run through the program.

Step 292 advances to step 292 which checks to see if a timed defrost flag TDF is true, and if it is, , step 298 sets mode flag MF to #4, requesting defrost. If timed defrost flag TDF is not true, step 300 performs a timed defrost decision block, which could result in the setting of flag TDF for detection on the next run through the program.

Step 300 advances to step 302 which checks to see if selector switch 174 has selected "cycle sentry", which is the mode in which the operative prime mover 28 is started and stopped according to the condition of the load in the served space 90. If the cycle mode has been selected, step 304 sets mode flag MF to #1, and the cycle sentry program shown in FIG. 11 will be run at the appropriate time.

If step 302 finds that the cycle sentry mode has not been selected, step 306 checks to see if the operative prime mover is the electric motor 32. If the operative prime mover is engine 30, not electric motor 32 the program goes to step 308, which sets mode flag MF to #2, indicating the continuous operating mode. If step 306 finds that the drive is the electric motor 32, step 306 further checks to see if the selected set point temperature is at or below 24 degrees F., indicating a frozen load. If the set point is above 24 degrees F., step 306 advances to step 308, just described. If the prime mover is the electric motor 32, and the set point indicates a frozen load, step 306 decides that the cycling mode should be used, notwithstanding the position of selector switch 174, going to step 304 which sets mode flag MF to #1, to indicate the cycling mode should be used.

Figure 5:
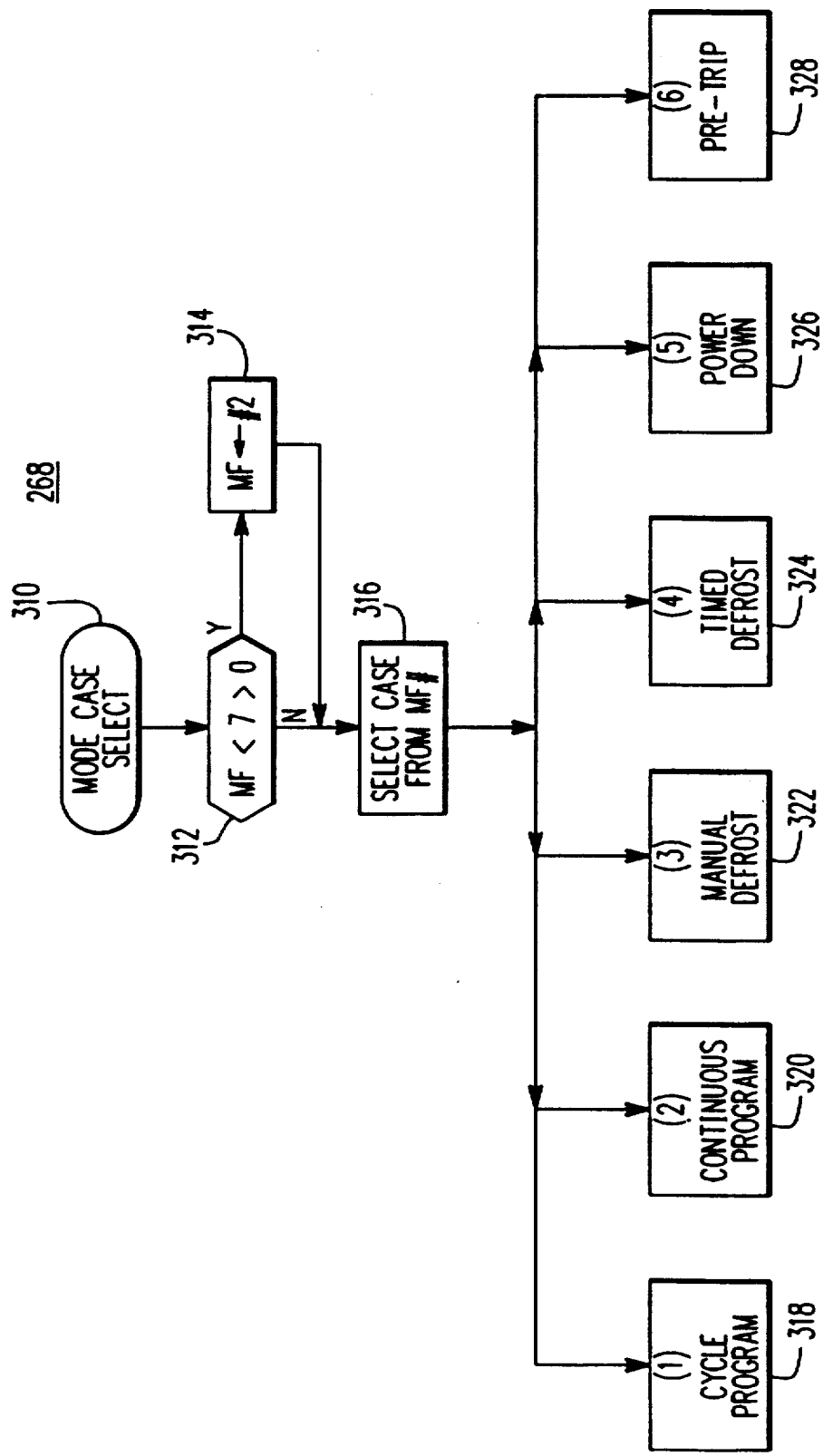
FIG. 5 is a flow chart of a "mode case select" function performed by the microprocessor.
Figure 10:
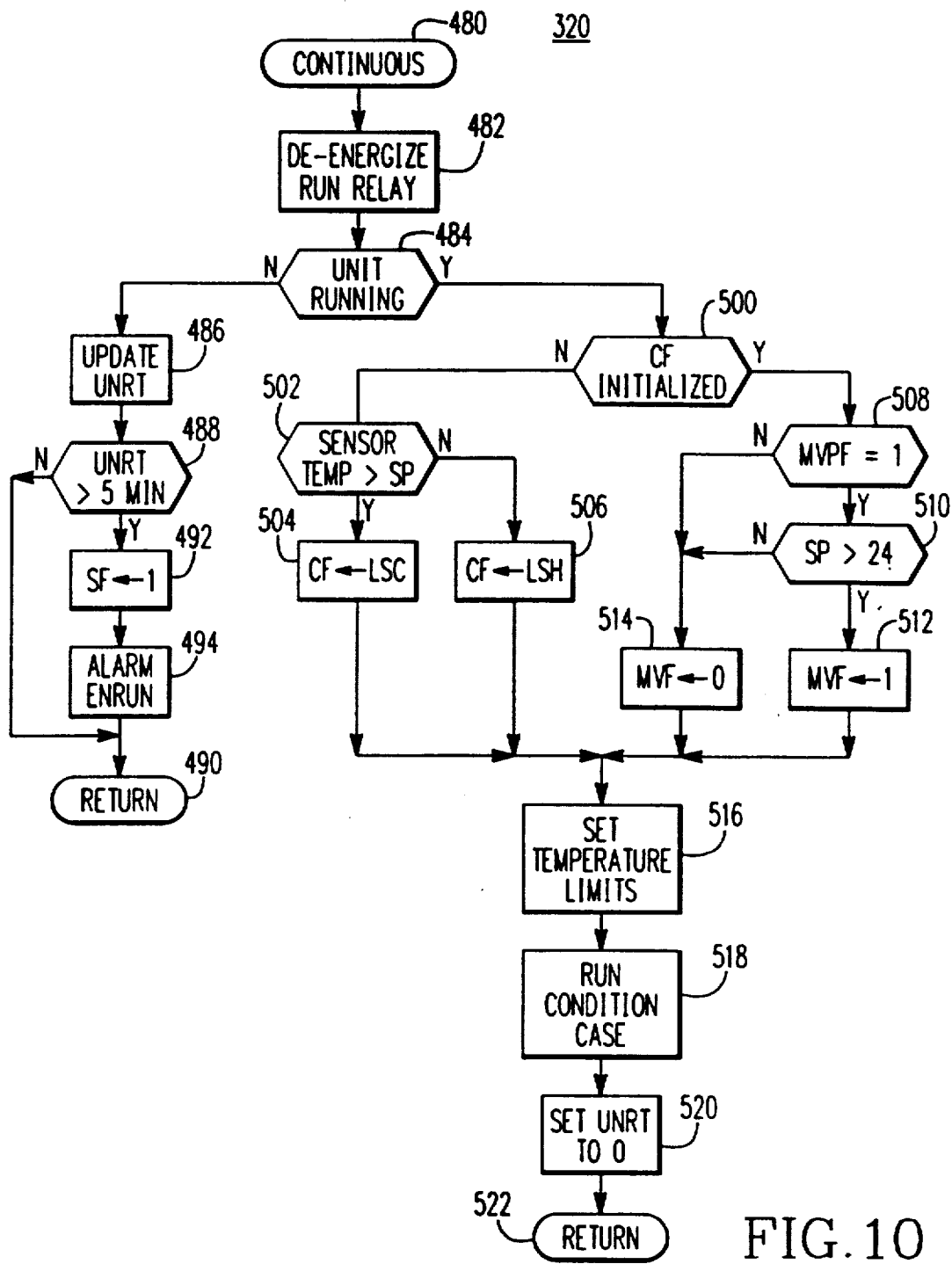
FIG. 10 is a flow chart of a "continuous" mode of operating the transport refrigeration system shown in FIG. 1.
Figure 11:
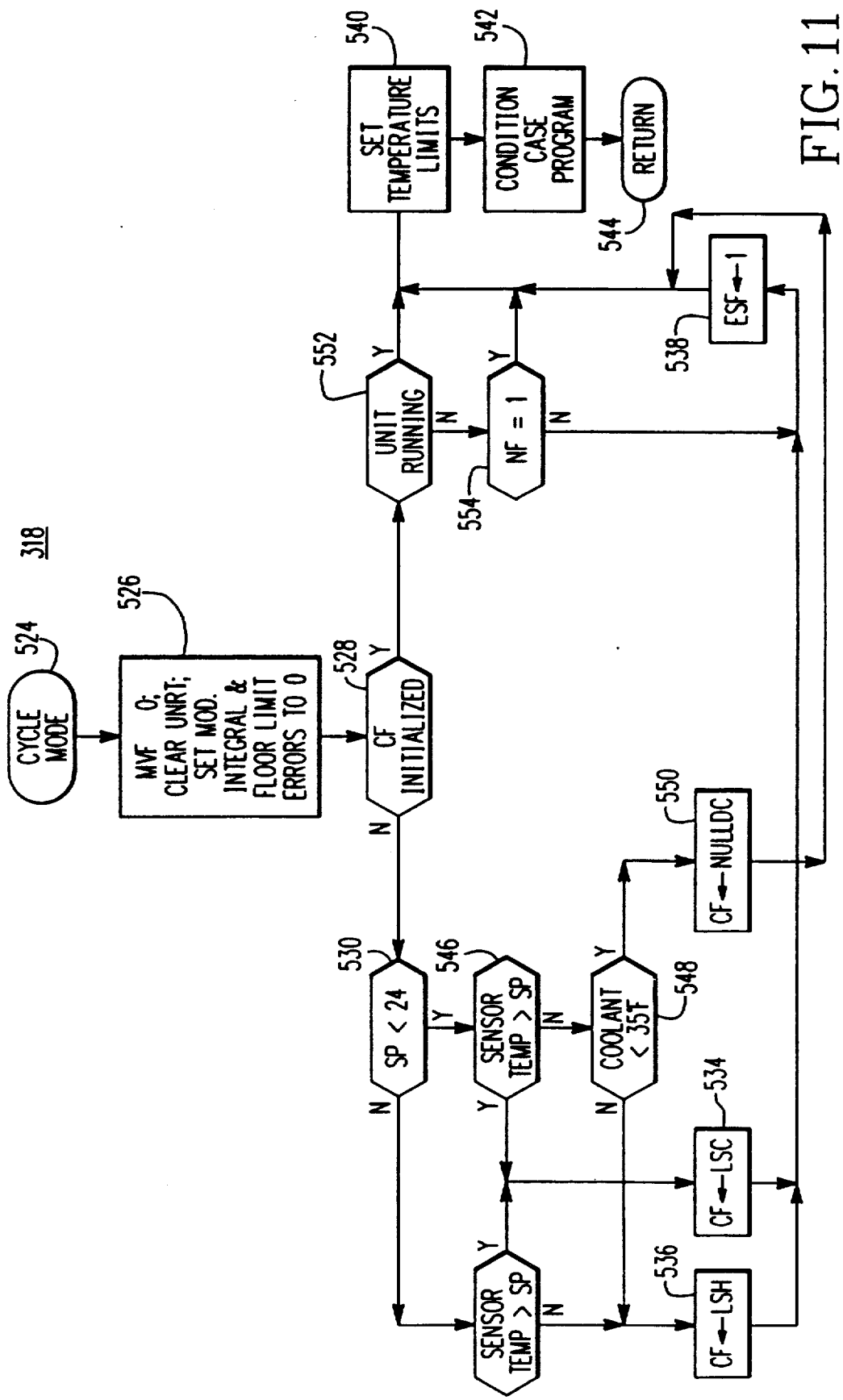
FIG. 11 is a flow chart of a "start-stop" mode of operating the transport refrigeration system shown in FIG. 1.

FIG. 5 sets forth the mode case select function 268 shown in block form in FIG. 4. Function 268 is entered at 310 and step 312 checks to see if the number of the mode flag MF is in the correct range of 1 through 6. If it is not, step 314 sets flag MF to the default mode #2, which signifies the continuous mode. The "yes" branch from step 312 and step 314 both go to step 316 which determines the number of mode flag MF. The program goes to function 318 when mode flag MF is #1, to run a cycling mode program, which is shown in FIG. 11. The program goes to function 320 when mode flag MF is #2, to run a continuous mode program, which is shown in FIG. 10. The program goes to function 322 when mode flag CF is #3, to run a manual defrost program; to function 324 when mode flag CF is #4 to run a timed defrost program; to function 326 when mode flag CF is #5 to run a power down program; and, to function 328 when mode flag CF is #6 to run a pre-trip program.

Function 284 of FIG. 4, an engine start program, is shown in detail in FIGS. 6A and 6B. As shown in step 282 of FIG. 4, the engine start program is run when the engine start flag is true, and as will be hereinafter described, the engine start flag is set true in the start-stop or cycling mode program of FIG. 11.

The engine start program is entered at 330 of FIG. 6A and an initial function of the program is to select an engine pre-heat time responsive to engine temperature. Step 332 obtains the output of the engine coolant or water temperature sensor (WTS) 116. Step 334 determines if the water temperature sensor output is in a plausible range by comparing it with a predetermined range preset in microprocessor memory 122. If the sensor value is not in the predetermined range, step 336 sets an alarm code WTSF for use by the operator or service personnel which indicates failure of the engine water temperature sensor 116.

If the water temperature sensor value is in the proper range, step 338 determines if the sensor value exceeds a first predetermined temperature, eg., 80 degrees F. or higher. If so, step 340 sets the engine pre-heat time (PH) to a predetermined minimum value, eg., 20 seconds. If the coolant temperature does not exceed the first predetermined value, step 342 determines if the coolant temperature is in a predetermined range, between the first predetermined value and a second predetermined value, eg., between 80 degrees F. and 20 degrees F. If the coolant temperature is in this predetermined range, step 344 uses the temperature value to access a look-up table stored in ROM 122. If step 342 finds the coolant temperature is not in the predetermined range, then the coolant temperature must be below the second predetermined value, e.g., 20 degrees F., and step 346 assigns a predetermined maximum value to the pre-heat time, e.g., 100 seconds. When step 334 finds that sensor 116 has failed, the program advances from the alarm step 336 to step 346, which assigns the maximum pre-heat time.

Figure 7:
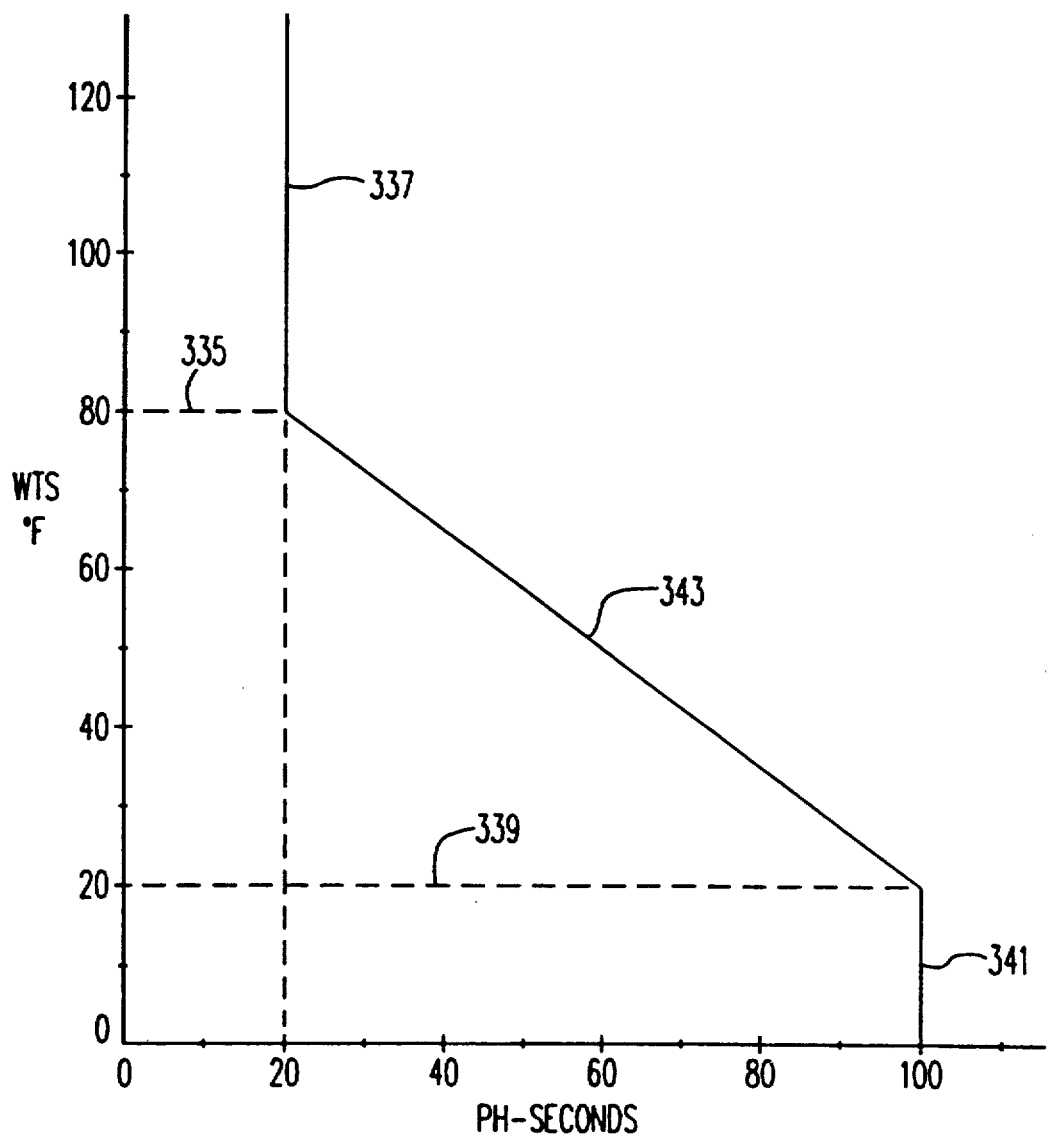
FIG. 7 is a graph which sets forth engine coolant temperature versus pre-heat time, illustrating graphically a look-up table of pre-heat times versus coolant temperatures.

FIG. 7 is a graph which illustrates the preheat time determination, having coolant temperature as determined by water temperature sensor (WTS) 116 on the ordinate and pre-heat time PH on the abscissa. When the coolant temperature is above a first predetermined value, indicated by broken line 335, the program assigns a predetermined minimum pre-heat time, indicated by solid line 337. When the coolant temperature is below a second predetermined value, indicated by broken line 339, the program assigns a predetermined maximum pre-heat time, indicated by solid line 341. When the coolant temperature is between the first and second predetermined values 335 and 339, the pre-heat time is obtained from a pre-heat look-up table, indicated by solid line 343. As shown by line 343 in FIG. 7, the pre-heat time is preferably a linear function of engine coolant temperature.

After the engine pre-heat time PH has been selected, step 348 energizes the pre-heat relay 152 which has its associated set of normally open contacts 153 connected in parallel with the manually operated pre-heat switch 150. The "microprocessor" position of selector switch 154 provides voltage to pre-heat relay 152 from conductor 128 to conductor 155. The microprocessor 96 controls the various relays by providing a sinking current path. Thus, when pre-heat relay 152 is energized, contacts 153 close and a circuit is established through the glow plugs 148 which includes the battery 126 and DC shunt 130. The engine reset switch 134 is not part of this circuit The next function of program 282 is to protect the battery and wiring against a fault in the glow plugs.

Step 348 includes a delay function, which delays reading the glow plug current for 2 seconds, for example, until the glow plug current has stabilized. Step 350 then checks the DC shunt reading, obtained via conductors 194 and 196, to see if the glow plug current is in a predetermined normal range, such as between −20 and −40 amperes, with the negative signs indicating battery discharge. If the glow plug current is not in the predetermined normal range, step 352 sets an alarm code GLOPL indicating that the current is out-of-range, and step 354 determines if the problem is causing excessive current flow. If the current is not between the high end of the normal range and a predetermined maximum allowable value, such as about −75 amperes, step 356 de-energizes the pre-heat relay and sets the pre-heat time "elapsed". This protects the battery and wiring, while allowing the engine to be started without pre-heat. Step 358 updates a pre-heat timer in RAM 124, which keeps track of pre-heat time, and step 360 checks timer PHT to determine when the pre-heat time PH has elapsed.

A next function of the engine starting program is to determine if the refrigerant circuit pressure is below a predetermined maximum allowable value, before actual cranking of the engine is permitted. When the preheat time PH has elapsed, step 362 energizes the run relay 158. Contacts 172 of relay 158 close to energize the engine fuel solenoid FS via the refrigerant high pressure cut-out switch (HPCO) 110. After a delay, such as 2 seconds, to enable the system to stabilize, step 364 checks to see if both sides of the high pressure cut-out switch are high. Microprocessor 96 checks the status of input conductors 200 and 202 to make this determination. If the refrigerant pressure on the high pressure side of the refrigerant circuit is not excessive, switch 110 will be closed and both sides will have battery voltage.

If step 364 finds that both sides of switch 110 are not high, step 366 de-energizes the pre-heat relay 152, as the engine will not be started. The program then goes into a diagnostic mode, to determine why both sides of switch 110 are not high. Step 368 checks to see if both sides of switch 110 are low. If not, then switch 110 is open, indicating excessive refrigerant pressure, and step 370 sets an alarm code indicating shutdown is due to high refrigerant pressure. If both inputs are low, then voltage has not been applied to switch 110, and step 373 sets an alarm code which indicates failure of the run relay 158.

Steps 370 and 372 both go to step 374, with step 374 setting the engine shutdown flag SDF and a modulation-valve-routine-complete flag MVCF true, with the setting of flag MVCF true indicating that closing of the modulation valve is not necessary since the engine will not be started. Step 374 further sets engine start flag ESF false, since the engine has not been started, and the program exits at 376.

When step 364 finds both sides of switch 110 high, indicating the refrigerant pressure is not excessive, step 378 determines if a modulation valve start feature has been selected, which feature closes the modulation valve prior to engine cranking to reduce the load on the engine. If this feature has been selected, step 380 initiates the running of the modulation valve start routine shown in FIG. 8. If step 378 finds that the modulation valve start feature has not been selected, step 382 sets modulation-valve-routine-complete flag MVCF to 1, indicating the program of FIG. 8 need not be run, it sets the modulation valve output 228 to provide 0 current to modulation valve 64, which maintains modulation valve 64 fully open, and step 382 disables the heat, high speed and hot gas relays 160, 162 and 166, respectively, to insure that the engine will start the refrigeration system in a low speed, cooling cycle mode.

Step 382 advances to step 384, as does step 380, with step 384 de-energizing the shutdown relay 156 during engine cranking. Contacts 168 of shutdown relay 156 thus close to connect the reset switch SSW between battery voltage and ground, with the time delay in the opening of contacts 134 upon excessive current functioning as a protective limit on engine cranking time. After the engine has been successfully started, the shutdown relay 156 will be energized, which is the fail-safe mode. With the run relay 158 energized, the start relay 146 has voltage via conductor 175, and step 384 energizes start relay 146 by providing a sinking current path via conductor 212. Step 384 also clears and starts a "start" timer ST in RAM 124, which keeps track of cranking time. Start relay 146 closes its set of normally open contacts 147 which energize starter solenoid (SS) 142. Starter solenoid 142 closes its set of normally open contacts 143 to connect starter motor 140 to battery 126.

Step 386 updates start timer ST, and a first check on engine starting is performed by steps 388 and 390, which allow the program to continue only if the engine speed exceeds a predetermined first value, such as 40 RPM, or the start time equals or exceeds a first predetermined period of time, such as 3 seconds. Once either of these two events has occurred, the program advances to step 392 to find out if this point in the program has been reached due to the start timer ST reaching the predetermined first time value, or due to the engine speed reaching the first predetermined engine speed value.

If step 392 finds that the start timer ST reached the predetermined first time value, either the engine did not start, or there is a problem, and the program begins a phase to determine whether or not the engine started, and if it did start, it provides diagnostics to indicate why steps 388 and 390 did not detect the start. Step 394 energizes the shutdown relay 156 to prevent the reset switch SSW from operating, which would remove voltage from conductor 128 and shut the unit down. Step 394 further de-energizes the start and pre-heat relays, as no further attempt to start the engine will be made, if indeed it did not start.

Step 396 delays for a short period of time to allow the engine to stabilize, if it did start, and step 398 then checks input conductor 198 to see if the low oil pressure switch (LOPS) 192 has opened, indicating oil pressure If this input is not high, then there is no oil pressure, and step 400 sets an alarm code FCRNK which indicates that the engine failed to crank. If input 198 is high, the low oil pressure switch is open, and the engine either started or switch 192 is defective. Step 402 checks input conductors 194 and 196 for the polarity of the battery current. If the polarity is not positive, we have two additional indications that the engine did not start, ie., low oil pressure and lack of alternator output, and step 404 sets an alarm code OPS which indicates the low oil pressure switch 192 is defective.

If step 402 finds the charge amperes positive, it indicates the alternator 138 is being driven by engine 30. Thus, engine 30 started and the faulty sensor is the engine speed or RPM sensor 118, and step 406 sets an alarm code RPMF indicating that sensor 118 is faulty. Step 406 also sets an RPM sensor fail flag RPMSFF true. Step 408 checks modulation-valve-routine-complete flag MVCF to determine if the modulation valve routine has been completed, and if it has not, the program exits at 416. If flag MVCF has been set true, step 410 sets a unit-running-flag URF true and step 412 sets flag MVCF true and engine start flag ESF false, with the latter indicating that the engine need not be started, since it is running. Steps 400 and 404 both proceed to step 412 via a step 414 which sets engine shutdown flag ESF true. The setting of the engine start flag false in step 412 now means that the engine need not be started, because it failed to start properly.

If program step 392 finds that this point of the program was reached because the engine RPM sensor 118 reached the first predetermined speed, eg., 40 RPM prior to the expiration of the first predetermined period of time, eg., 3 seconds, then step 418 updates the start timer ST and the program advances to a second starting phase, implemented by steps 420 and 422, which phase is not passed until either the engine speed reaches or exceeds a second predetermined value, eg., 800 RPM, determined by step 422, or the start timer ST reaches or exceeds a second predetermined value, eg., 30 seconds, determined by step 420.

Upon passing this second starting phase, step 424 determines if the start timer ST equals or exceeds the second predetermined period of time, and if not, it indicates the engine speed has passed the second predetermined value and has started properly. Step 424 goes through the hereinbefore described steps 408, 410, and 412, when step 424 finds a successful engine start. When step 424 finds that the program reached this point because the start timer ST reached the second predetermined period of time, then the program performs diagnostics similar to those described starting with step 398. Step 426 energizes the shutdown relay 156, and de-energizes the start and pre-heat relays 146 and 152. Step 428 delays for a short time to enable the system to stabilize, in the event the engine did start, and step 430 checks for oil pressure. If the oil pressure is low, indicating the engine did not start, step 432 sets an alarm code FSTRT which indicates the engine failed to start. Step 400 set an alarm code FCRNK which indicated the engine failed to crank, but since the first starting phase was successfully passed, the engine did indeed crank, but by failing the second phase it indicates that although it cranked, it failed to start.

If step 430 finds the oil pressure input high, step 434 checks to see if the charge amperes are positive, indicating alternator 138 is being driven by prime mover arrangement 28. If the charge amperes are not positive, step 436 sets alarm code OPS indicating failure of the low oil pressure switch 192, step 438 sets the engine shutdown flag SDF true, and the program goes to step 412. If the charge amperes are positive, it indicates engine 30 has started, and the program goes to step 406, hereinbefore described, which sets alarm RPMF indicating failure of the engine RPM sensor 118. The program then advances through the hereinbefore described steps 410 and 412 to the program exit 416.

Figure 8:
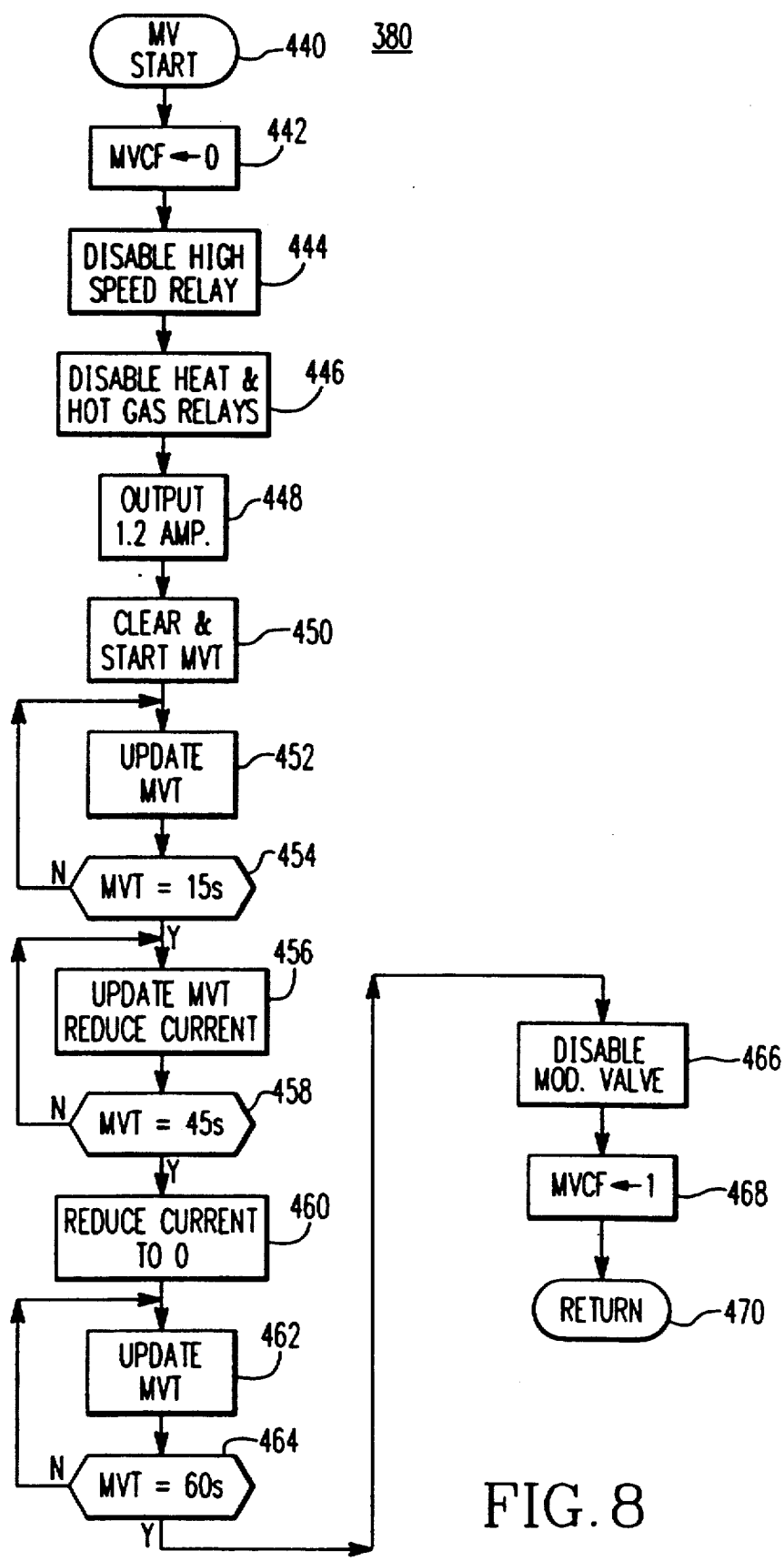
FIG. 8 is a flow chart of a modulation valve start routine executed by the microprocessor when the engine is to be started in order to close a suction line modulation valve and reduce starting load on the engine.

The modulation valve start routine function 380 shown in block form in FIG. 6A is shown in detail in FIG. 8. This function is entered at 440 and step 442 sets the modulation valve routine complete flag (MVCF) false. Steps 444 and 446 make sure the engine will start in a low speed cooling mode, by disabling the high speed, heat and hot gas relays 162, 160 and 166, respectively. Step 448 then outputs the value of current required to fully close modulation valve 64, eg., 1.2 amperes for a typical valve. Step 450 clears and starts a modulation valve timer (MVT) in RAM 124. Step 452 updates timer MVT and step 454 determines when timer MVT reaches a predetermined period of time, such as 15 seconds. Step 456 updates timer MVT and initiates a linear decay of modulation valve current to a predetermined value, such as 600 ma. Step 458 determines when timer MVT reaches a predetermined period of time, such as 45 seconds, and then step 460 drops the modulation valve current to zero, to fully open the valve. Step 462 continues to update timer MVT, and when the time reaches a predetermined value, such as 60 seconds, as detected by a step 464, step 466 checks to see if the cycling mode has been selected, and if so, the modulation valve 64 is disabled, as it is only used in the continuous mode. Step 468 sets flag MVCF true, and the program exits at 470.

Figure 9:
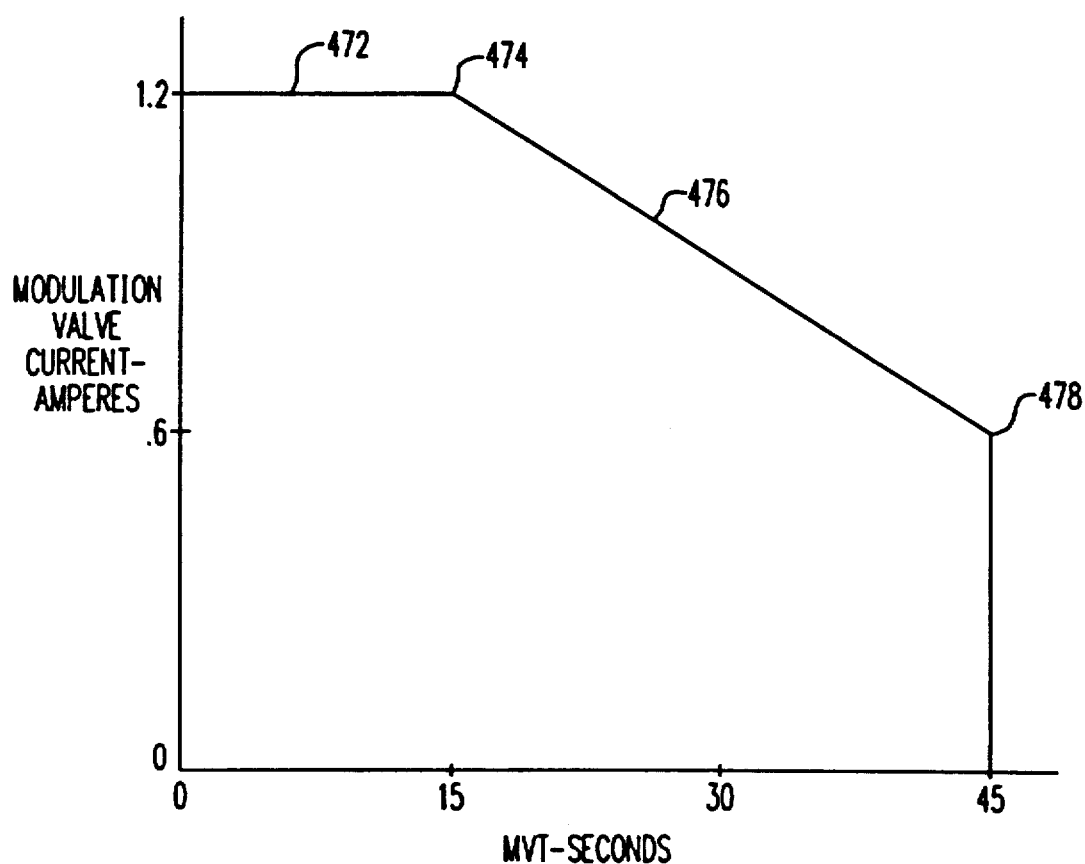
FIG. 9 is a graph which sets forth a modulation valve current versus time pattern followed by the flow chart function shown in FIG. 8.

FIG. 9 is a graph which sets forth some of the functions of the modulation valve start routine 380 shown in FIG. 8, plotting modulation valve current on the ordinate and MVT time on the abscissa The modulation valve current starts at a predetermined level 472, to fully close valve 64. After a predetermined first period of MVT time, indicated at point 474, a linear decay in current magnitude is initiated with the linear decay being illustrated with straight line 476. When the MVT time reaches a second predetermined period of time, indicated at point 478, the valve current is reduced to 0.

In FIG. 5, when step 316 found mode flag MF set to #2, the "continuous" mode program 320 was run. The continuous mode program 320 is set forth in detail in FIG. 10. Program 320 is entered at 480 and step 482 deenergizes the run relay 158. If the unit 20 is running, switch 174 in FIG. 2B will provide voltage to conductor 385 via the "continuous" position of switch 174 and the normally closed contacts 170 of the run relay 158. Step 484 checks to see if unit 20 is indeed running, such as by checking its input 265 for voltage. If unit 20 is not running, step 486 updates a unit-not-running timer (UNRT) in RAM 124. Step 488 determines if timer UNRT has reached a predetermined value, such as 5 minutes If this predetermined time has not been reached, the program exits at 490, and the program will continue to exit each time it is run until step 488 finds timer UNRT has reached the predetermined period of time. Step 488 then goes to step 492 which sets the unit shutdown flag SDF true, step 494 sets an alarm code ENRUN which indicates the prime mover 28 is not running, and the program exits at 490.

When step 484 finds the unit running, step 500 checks to see if a condition flag CF has been initialized. If this flag has not been initialized, it indicates the unit has just been turned on, and step 502 checks to see if the value of the selected temperature sensor, ie., either return air sensor 100 or discharge sensor 104, is greater than the selected set point temperature. If it is, step 504 sets condition flag CF to call for a low speed cooling (LSC) mode. If the sensor temperature does not exceed set point, step 506 sets condition flag CF to call for a low speed heating (LSH) mode.

If step 500 finds condition flag CF initialized, unit 20 has been running and one of the refrigerant operating conditions has already been selected for unit 20. Step 508 then checks a modulation-valve-present flag (MVPF) to see if jumper 206 shown in FIG. 2B is in or out. If jumper 206 is out, flag MVPF will be false, and the continuous mode will be run without suction line modulation. Step 514 sets a modulation flag MVF false, to indicate there will be no suction line modulation. If jumper 206 is in, flag MVPF will be true and step 510 checks the set point temperature to determine if the load being conditioned in space 90 is a fresh or a frozen load. If step 510 finds the set point is not greater than 24 degrees F., for example, the load is frozen and suction line modulation should not be used, notwithstanding that jumper 206 is in and flag MVPF is true, so step 510 goes to step 514 to set flag MVF false. If step 510 finds a fresh load is being conditioned, step 510 goes to step 512 to set flag MVF true, indicating the continuous mode is with suction line modulation.

Steps 504, 506, 512 and 514 all go to step 516 which sets temperature limits for the operative control algorithm. Step 518 then runs a "condition case" program, which simply determines which operational mode has been selected by the condition flag CF, eg., high speed cool, low speed cool, low speed heat and high speed heat. Step 520 sets the unit not running timer UNRT to 0 and the program exits at 522.

In FIG. 5, when step 316 found the mode flag set to #1, the "cycle" mode program 318 was run. The cycle sentry or start-stop mode program 318 is set forth in detail in FIG. 11. The cycle sentry program 318 is entered at 524 and step 526 sets the modulation flag MVF false, and modulation related values such as integral error and floor limit error are set to 0, since suction line modulation is not used during the cycle mode. Step 526 also clears the unit not running timer UNRT. Step 528 then checks to see if the condition flag has been initialized If it has not, unit 20 has just been turned on and step 528 goes to step 530 to determine if the load in load space 90 is fresh or frozen. If the load is fresh the set point temperature will be above 24 degrees F., and step 530 goes to step 532 to determine the temperature of space 90 relative to set point. If the operative load temperature sensor detects that the load temperature is greater than set point, step 534 sets the condition flag CF to indicate that the unit should operate in a low speed cool mode. If step 532 finds the load temperature is less than set point, then step 536 sets the condition flag CF to indioate the unit should run in low speed heat. Steps 534 and 536 both go to step 538 which sets the engine start flag ESF true, indicating the engine should be started by the engine start program described relative to FIGS. 6A and 6B. Step 540 sets the temperature limits for the relevant control algorithm, step 542 checks the condition flag CF to determine the proper operative mode of the selected control algorithm, and the program exits at 544.

If step 530 finds the load space 90 contains a frozen load, step 530 goes to step 546 which checks the load temperature relative to the selected set point temperature. If the load temperature is above set point, step 546 goes to the hereinbefore described step 534 to set condition flag CF to call for a low speed cool operative condition. If the load temperature is below the selected set point temperature, step 548 determines if the engine coolant temperature is warm enough to allow the engine to remain off. For example, step 548 checks sensor 116 to see if the engine coolant temperature is above 35 degrees F. If it is not, then step 548 goes to the hereinbefore described step 536 which sets condition flag CF to call for low speed heat, and step 538 sets the engine start flag ESF true to call for an engine start.

If the engine coolant temperature is above the predetermined temperature, eg., 35 degrees F., then engine 30 may remain off and step 548 goes to step 550 which sets condition flag CF to call for a null condition. Step 550 then goes to the hereinbefore described step 540, by-passing step 538, as engine start flag ESF should not be set true.

If step 528 finds the condition flag CF initialized, step 552 checks to see if unit 20 is running, a prime mover 30 or 32 is driving compressor 26. If it is not running, step 554 checks to see if it should be running by checking the condition of a null flag NF. If flag NF is true, engine 34 should not be running and step 554 goes to step 540 to set the temperature limits, step 542 selects the desired operative condition from the setting of condition flag CF, and the program exits at 544. If flag NF is not true, the engine should be running and step 554 goes to step 538 to set engine start flag ESF true, and then the program goes through steps 540 and 542, exiting at 544.

Figure 12:
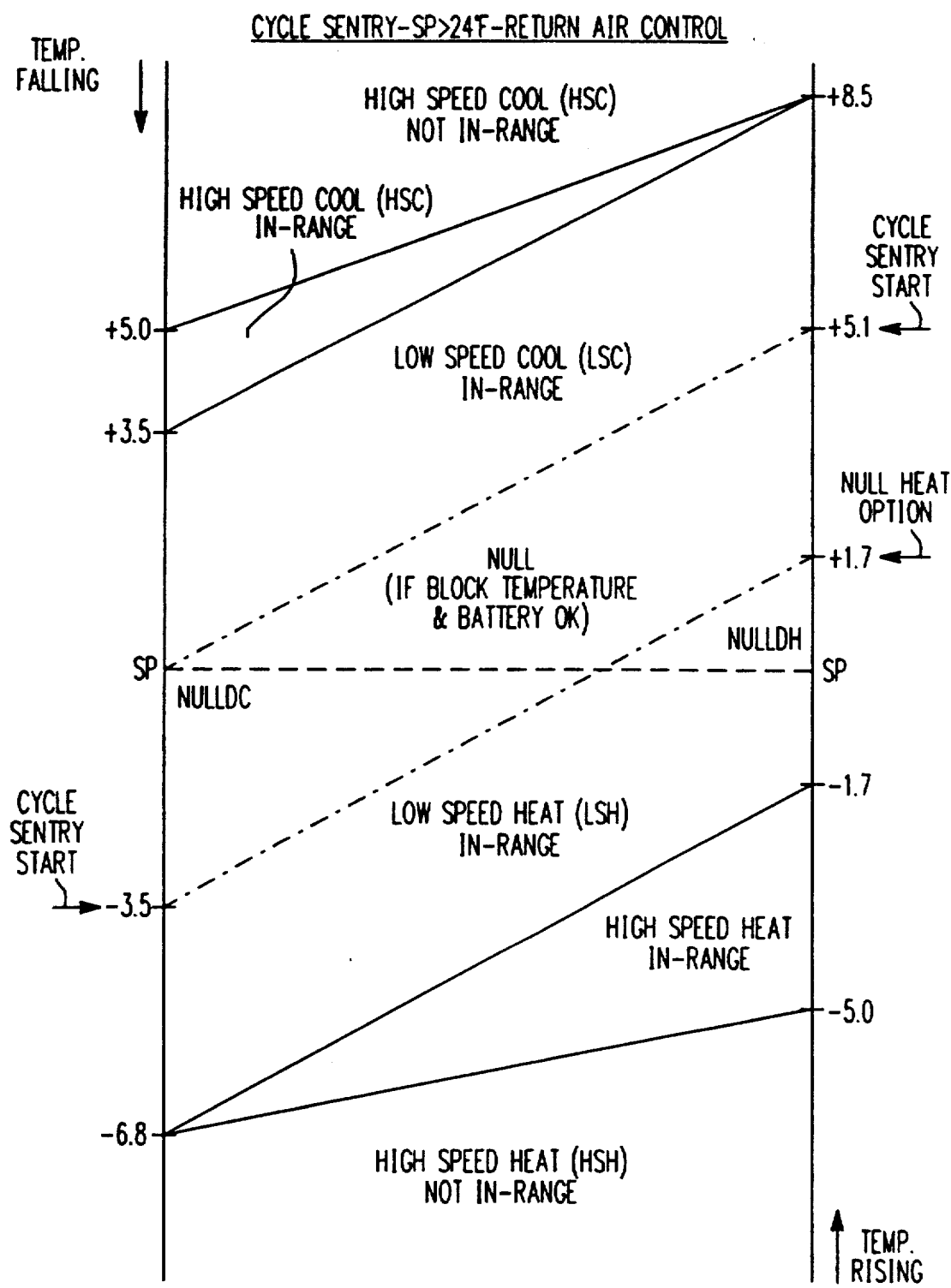
FIG. 12 is a chart setting forth a return-air control algorithm utilized by the start-stop mode shown in FIG. 11, when the set point is greater than 24 degrees F.

FIG. 12 is a control algorithm for the cycle sentry mode, which is used when the selected set point temperature is above 24 degrees F., indicating a fresh load, and the operative sensor is the return air sensor 100. When the temperature of the load space 90 is falling, the left-hand side of the algorithm is utilized, and when the temperature is rising the right-hand side of the algorithm is used. The various operating modes are the different modes which are indicated by the condition flag CF, and selected in steps 518 and 542 of the continuous and cycle programs 320 and 318, respectively.

Assuming that the load space is in initial temperature pull down, the operative mode will be high speed cool, not-in-range, until the load temperature as indicated by return air sensor 100 indicates a value 5 degrees F. above set point. A high speed cool, in-range program will then be run until sensor 100 indicates the selected set point temperature has been reached, at which point the engine 30 may be turned off, if the engine coolant temperature is high enough, as described relative to step 548 in FIG. 11, to enter a null condition.

The microprocessor 96 "remembers" whether each null condition is entered from a cooling mode or from a heating mode by running two different null programs which will be called NULLDC when null is entered from a cooling mode, and NULLDH when null is entered from a heating mode. If the load temperature continues to drop and reaches a temperature error relative to set point of $-3.5$ degrees F, with the minus sign $(-)$ indicating the load temperature is below set point, a low speed heat, in-range program is called for, and if the temperature error drops to $-6.8$ degrees F., a high speed heat, not-in-range program is called for.

If the load temperature is rising from high speed heat, not-in range, when the return air temperature error is $-5$ degrees F., the program calls for a high speed heat, in-range program. When the temperature error reaches $-1.7$ degrees F., a low speed heat, in-range program is called for, and when the temperature error reaches $+1.7$, with the positive sign $(+)$ indicating above set point, the NULLDH program is called for, which turns engine 30 off. If the temperature error rises to $+5.1$ degrees, the engine will be started in a low speed cool mode, and if the temperature error continues to rise to 8.5 degrees F., the high speed cool, not-in-range program will be called for.

When the temperature is falling and the NULLDC range is exceeded by the negative error reaching the lower limit of NULLDC, and the refrigeration unit's operating mode is changed to low speed heat, in-range, a timer in RAM 124 may be started, such as an 8 minute timer, for example. If the return air temperature does not reach an error of $-1.7$ degrees F. within 8 minutes, with an error of $-1.7$ degrees F. being the temperature which initiates low speed heat during a rising temperature, the high speed heat, in-range program may be initiated. The high speed heat mode will then remain in control until the NULL zone is reached.

In like manner, when the temperature is rising and NULLDH changes to low speed cool, in-range, a timer may be started, such as an 8 minute timer, for example, and if the return air temperature does not reach an error of $+3.5$ degrees F. within 8 minutes, with $+3.5$ degrees F. being the error temperature which initiates low speed cool during a falling temperature, the high speed cool, in-range program may be initiated, which will then remain in control until the NULL zone is reached at set point.

Figure 13:
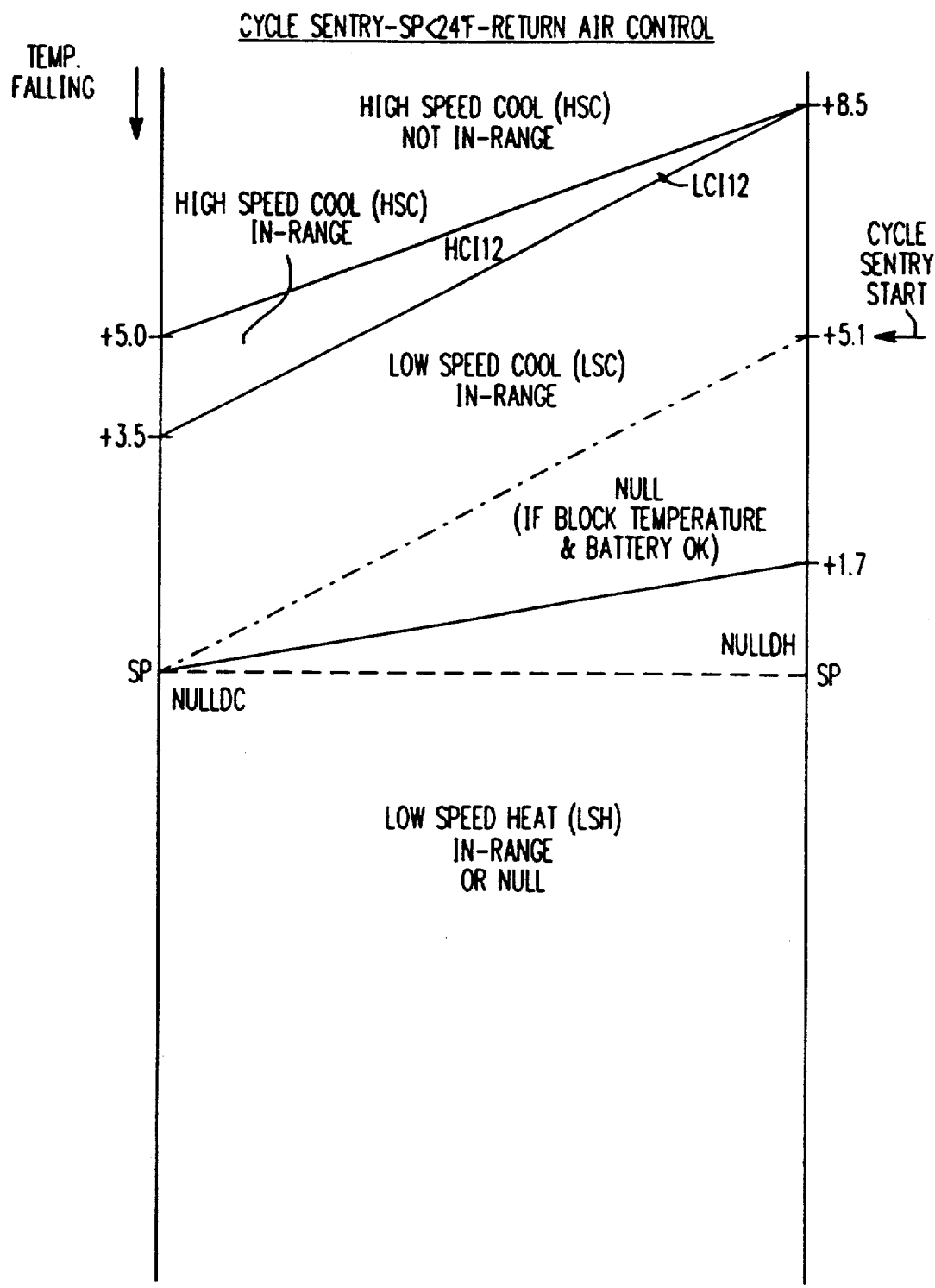
FIG. 13 is a chart setting forth a return-air control algorithm utilized by the start-stop mode shown in FIG. 11, when the set point is 24 degrees and below.

FIG. 13 sets forth a control algorithm which may be used in the cycle sentry mode when the set point is set below 24 degrees F., ie., the load is frozen, and the operative sensor is the return air sensor 100. With a falling temperature, high speed cool, not-in-range is the operative program until a temperature error of $+5$ degrees F. is reached, at which time the high speed cool, in-range program is called for. When set point is reached, the NULLDC program may be called for, or a low speed heat, in range program may be called for, depending upon whether heat is locked out by a selectable control option.

Upon a rising temperature, the low speed heat option would call for NULLDH at an error temperature of $+1.7$ degrees F. and for low speed cool, in-range at an error temperature of +5.1 degrees F. At an error of +8.5 degrees F., the high speed cool, not-in-range program would be called for. When the error +5.1 degrees F. is reached during a rising temperature, a timer, such as a 12 minute timer, for example, may be set, which would give the low speed cool program 12 minutes to reach an error temperature of +3.5, or otherwise trigger high speed cool, which would then remain in control until set point is reached.

Figure 14A:
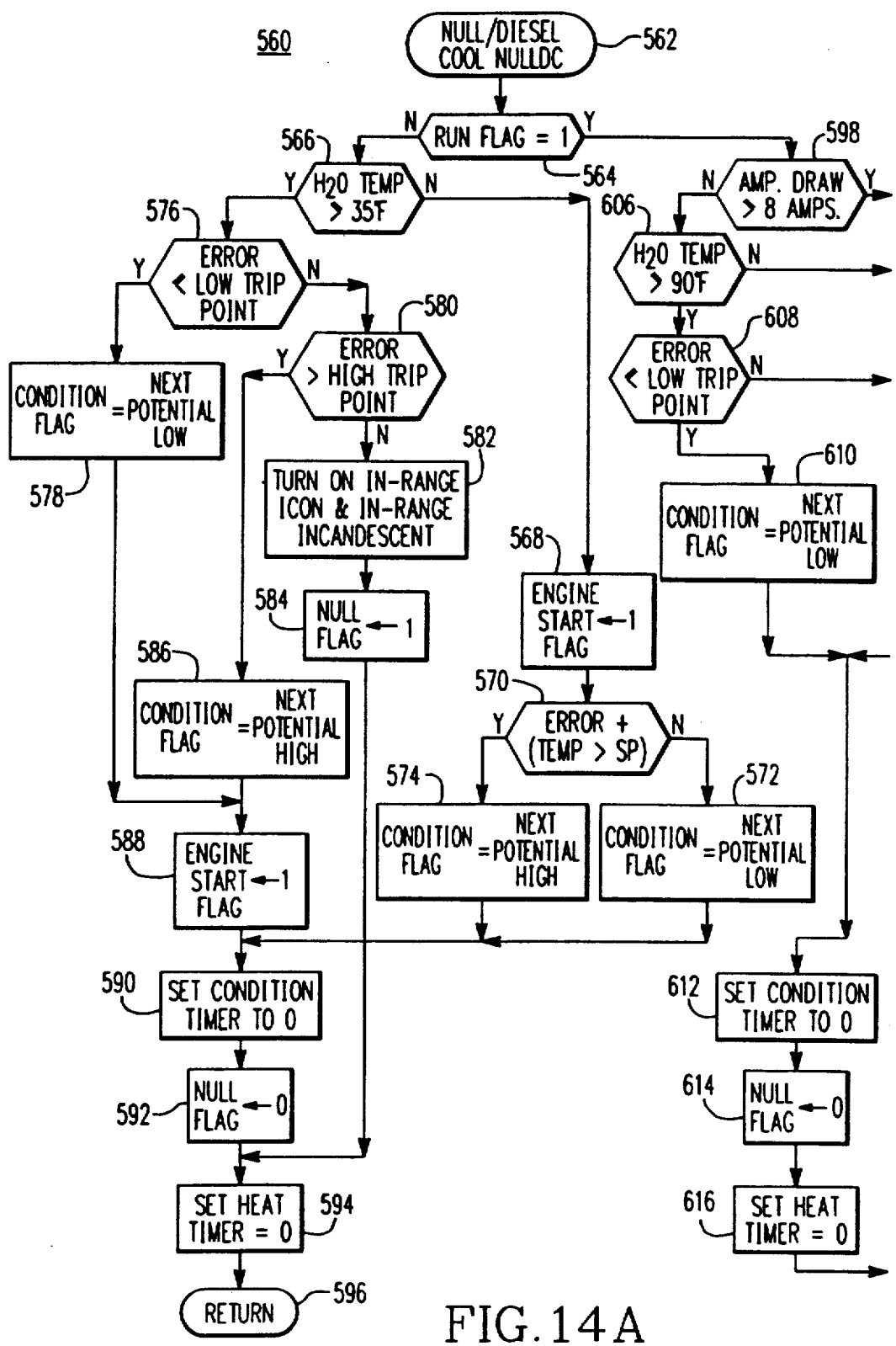
FIGS. 14A and 14B may be assembled to provide a flow chart which implements going from a cooling cycle into a null cycle, as set forth in the algorithms of FIGS. 12 and 13.
Figure 14B:
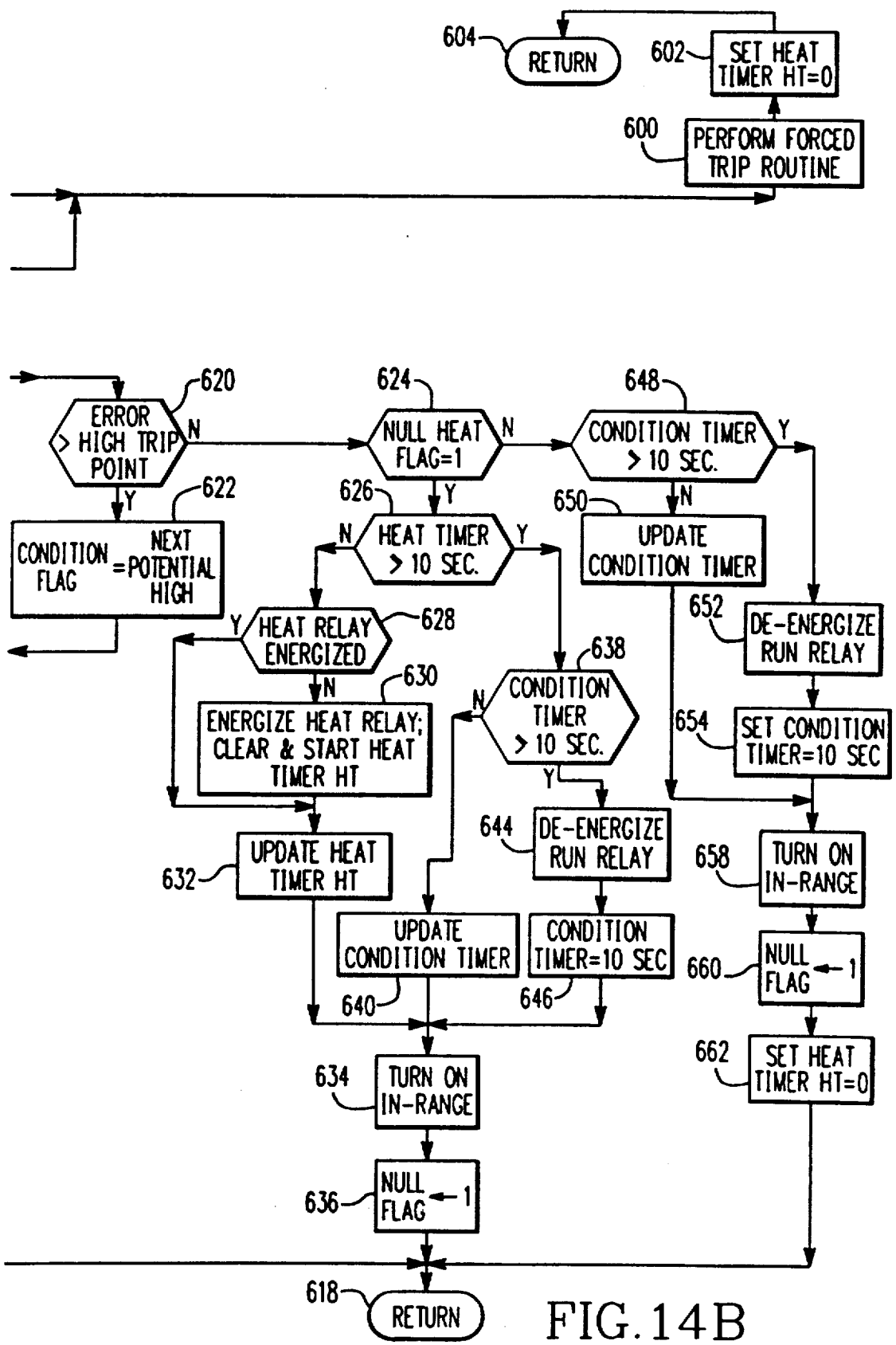

FIGS. 14A and 14B may be combined to provide a program 560 for the hereinbefore mentioned operating condition NULLDC, which program is called when the null condition is entered from a cooling cycle. Program 560 is entered at 562 and step 564 checks a run flag RF to see if unit 20 is running. If unit 20 is not running, step 566 checks the input from engine coolant sensor 116 to see if the engine should be started because its temperature dropped below a predetermined value, such as 35 degrees F. If the coolant temperature is below the predetermined value, step 568 sets the engine start flag ESF true, to signify that the engine should be started.

Step 570 then determines whether the engine should be started in a heating cycle or a cooling cycle, by checking the temperature of the conditioned space 90 relative to the set point temperature. This is quickly checked by determining whether the error between the load temperature and the set point temperature is positive or negative. If step 570 finds the error negative, ie., the load temperature is below or "colder" than set point, and step 572 sets condition flag CF to the "next potential low". The term "next potential low" means the unit operating condition which is just below the present operating condition on the left-hand side of the pertinent control algorithm. Using the control algorithm of FIG. 12 as an example, since the present operating condition is NULLDC, the next operating condition in the lower direction would be low speed heat, with or without the hereinbefore mentioned 8 minute timer, as desired.

If the error is positive, ie., the load temperature is above or "warmer" than set point, and step 574 sets condition flag CF to the "next potential high". The term "next potential high" means the unit operating condition which is just above the present operating condition on the right-hand side of the pertinent control algorithm. For example, since the present operating condition is NULLDC, the next operating condition in the upper direction on the control algorithm of FIG. 12 would be low speed cool, with or without the hereinbefore mentioned 8 minute timer, as desired.

If step 566 finds the engine temperature is greater than the predetermined temperature, eg., 35 degrees F., the engine does not have to be started because it is getting cold and step 566 goes to step 576 which compares the error between load temperature and set point with the "low trip point". The term "low trip point" means the error on the pertinent control algorithm at the low side of the current operating condition which triggers the next lower operating condition. Using the algorithm of FIG. 12 as an example, the "low trip point" for the operating condition NULLDC is −3.5. If step 576 finds the error is below than the low trip point on the control algorithm, the load temperature has dropped out of the range of the current operating condition and step 578 sets condition flag CF to the next potential low, which would be low speed heat in the control algorithm of FIG. 12.

If step 576 finds that the error is not below the low trip point, step 580 determines if the error is greater than, ie., above the "high trip point" on the control algorithm. The term "high trip point" means the error on the pertinent control algorithm at the high side of the current operating condition which will trigger the next higher operating condition. Using the algorithm of FIG. 12 as an example, the "high trip point" for the operating condition NULLDC is +5.1. If step 580 finds the error is greater than the high trip point, the load temperature has risen out of the range of the current operating condition and step 586 sets the condition flag CF to the next potential high, which would be low speed cool in the control algorithm of FIG. 12.

If step 580 finds the error is not greater than the high trip point, the error is thus still within the range of the current operating condition and step 580 goes to step 582 which turns on display elements which indicate the load temperature is "in-range", and step 584 sets null flag NF true, to indicate that the unit should be in null.

Steps 578 and 580 both proceed to step 588 which sets engine start flag ESF true, to indicate engine 30 should be started. Step 588 and steps 572 and 574 all proceed to step 590 which sets a condition timer CT in RAM 124 to zero. Condition timer CT times how long the unit has been in each new operating condition, to insure that the unit remains in each operating condition for a predetermined minimum period of time, eg., 10 seconds, before going to another operating condition Step 592 goes to step 594, as does step 584, with step 594 setting a heat timer HT in RAM 124 to 0. The purpose of heat timer HT will be hereinafter explained. The program exits at 596.

If step 564 finds the engine running, step 564 goes to step 598 which checks to see if the battery charging current exceeds a predetermined value, eg., 8 amperes, indicating the current battery condition is such that the engine should not be stopped. If step 598 finds the battery charging current exceeds the predetermined value, step 600 performs a "forced trip" routine, ie., step 600 keeps the engine running. Step 6.02 sets heat timer HT to 0, and the program exits at 604. The forced trip routine of step 600 sets null flag NF to 0, indicating the unit should not stop, and it sets condition flag CF to either the next potential low or the next potential high, using the value and polarity of the error between the load temperature and set point to make the determination.

If step 598 finds the battery charging current is less than the predetermined value, step 598 goes to step 606 which checks the input provided by engine coolant sensor 116 to see if engine 30 is warm enough to turn off, ie., above a predetermined temperature such as 90 degrees F. Step 566 started the engine when the temperature dropped below 35 degrees F., for example, and step 606 makes sure the engine is above 90 degrees F., for example, when it stops. This difference between the engine starting and stopping temperatures insures that engine 30, once turned off, will not be quickly started again due to step 566. If step 606 finds the engine coolant temperature below the predetermined value, step 606 goes to step 600 to continue running engine 30.

If step 606 finds the temperature of the engine coolant warmer than the predetermined temperature, step 608 determines if the load temperature versus set point temperature error is below the low trip point If so, step 610 sets condition flag CF to the next potential low condition, step 612 sets condition timer CT to 0, step 614 sets null flag NF to 0, step 616 sets heat timer HT to 0, and the program exits at 618. If step 608 finds the error is above the low trip point, step 620 determines if the error exceeds the high trip point. If it does, step 622 sets condition flag CF to the next potential high, and the program continues to the hereinbefore described step 612.

If step 620 finds the load temperature versus set point error is not above the high trip point, the load temperature is in the range of NULLDC, and the engine may be stopped. Before stopping the engine, however, step 624 checks a null heat flag NHF to see if it is set. Flag NHF is set to select a program option which, when unit 20 enters null from a cooling cycle, causes unit 20 to switch from cool to heat for a short period of time just long enough to warm the evaporator coil 62. Entering null with a cold evaporator may cause the "cold" from the evaporator to affect the operative temperature sensor and cause premature starting of engine 30.

If the null heat option has been selected, ie., flag NHF is true, step 624 goes to step 626 which checks the hereinbefore mentioned heat timer HT, to see if it has reached or exceeded a predetermined value, e.g., 10 seconds, selected as the time for the unit to be in a heating cycle, before entering the null mode from a cooling cycle. At this point in the program, heat timer HT will be 0 and the program checks to see if the heat relay 160 is energized. At this point in the program heat relay 160 will not be energized, and step 630 energizes heat relay 160 and it clears and starts heat timer HT. Step 632 updates heat timer HT, step 634 turns on display elements to indicate "in-range", ie., that the load temperature is in the "null" range, step 636 sets null flag NF true, indicating the load temperature is in the "null" range, and the program exits at 618. The next time through the program, step 628 will find heat relay 160 energized and proceed to step 632, to update heat timer HT. When step 626 finds heat timer HT has reached the predetermined value, eg., 10 seconds, step 626 goes to step 638 which checks condition timer CT to make sure that unit 20 has been in the present operating condition for the predetermined time, eg., 10 seconds in this example. If the predetermined value of condition timer CT is longer than the predetermined value of heat timer HT, then step 638 may find that condition timer CT has not reached the predetermined value, and step 638 would proceed to step 640 which updates condition timer CT.

When condition timer CT reaches the predetermined value, step 638 goes to step 644 which de-energizes the run relay 158 to stop engine 30 by removing voltage from the fuel solenoid FS. Step 646 sets condition timer CT equal to the predetermined value, and the program goes through the hereinbefore mentioned steps 634 and 636 to the program exit 618.

If step 624 finds that the null heat option has not been selected, ie., flag NHF is false, step 624 goes to step 648 to check the value of condition timer CT. If condition timer CT has not reached the predetermined value, step 650 updates condition timer CT. If step 648 finds condition timer CT has reached the predetermined value, step 652 de-energizes the run relay 158, and step 654 sets condition timer CT to the predetermined value. Step 654 and step 650 both go to step 658 which turns on "in-range" display elements, step 660 sets null flag NF true, step 662 sets heat timer HT to 0, and the program exits at 618.

The program for NULLDH is similar to the program for NULLDC, except steps 624 through 646 related to the null heat option are omitted, since NULLDH is entered from a heating cycle and the evaporator will already be warm.

We claim:

1. A method of operating a transport refrigeration unit which includes microprocessor based electrical control for controlling the temperature of a conditioned space via heating, cooling and null cycles, and a refrigerant circuit which includes a compressor, a condenser, and an evaporator, and including a prime mover arrangement for driving the compressor which includes an internal combustion engine which is automatically started and stopped by the electrical control in response to predetermined conditions, comprising the steps of:
    sensing the temperature of the engine prior to each start thereof,
    pre-heating the engine prior to each start thereof,
    providing predetermined minimum and maximum engine pre-heat times for first and second predetermined engine temperatures, respectively,
    providing a look-up table which relates engine temperature to pre-heat time for engine temperatures between the first and second predetermined values,
    providing a plausible range for the engine temperature,
    determining if the sensed temperature is in the plausible range,
    said pre-heating step heating the engine for the predetermined maximum pre-heat time when the sensed temperature is not in the plausible range,
    determining the location of the sensed temperature relative to the first and second predetermined engine temperatures,
    said pre-heating step heating the engine for the minimum pre-heat time when the sensed temperature is at, and when it is above, the first predetermined temperature,
    said pre-heating step heating the engine for the maximum pre-heat time when the sensed temperature is at, and when it is below, the second predetermined temperature,
    and accessing the look-up table when the sensed engine temperature is between the first and second predetermined values, to provide a pre-heat time related to the specific engine temperature,
    said pre-heating step heating the engine for the pre-heat time obtained from the look-up table when the sensed engine temperature is between the first and second predetermined values.

2. The method of claim 1 including the step of setting an alarm when the sensed temperature is not in the plausible range.

3. The method of claim 1 wherein the preheating step includes the steps of:
    heating the engine electrically,
    measuring the magnitude of the resulting current flow a predetermined period of time after the pre-heating step is initiated,
    determining if the measured current magnitude exceeds a predetermined value,
    and terminating the pre-heating step in response to the determining step when the current magnitude exceeds the predetermined value.

4. The method of claim wherein the preheating step includes the steps of:
    heating the engine electrically,
    measuring the magnitude of the resulting current flow a predetermined period of time after the pre-heating step is initiated, determining if the measured current magnitude is within a predetermined normal range, setting an alarm when the measured current magnitude is not within the predetermined range, determining if the measured current magnitude exceeds a predetermined value when the measured current is not within the predetermined range, and terminating the pre-heat step in response to a determination that the measured current magnitude exceeds the predetermined value.

5. The method of claim 1 wherein the refrigerant circuit includes a high pressure cut-out switch having first and second sides connected in a control circuit in which voltage is applied to the high pressure cut-out switch via a predetermined relay, with the high pressure cut-out switch being closed until pressure exceeds a predetermined value, including the steps of:

detecting the voltage level on each side of the high pressure cut-out switch during the process of starting the internal combustion engine, setting a first alarm indicating high refrigerant pressure, in response to detecting voltage on only one side of the high pressure cut-out switch, setting a second alarm indicating failure of the predetermined relay in response to absence of voltage on either side of the high pressure cut-out switch, and terminating the starting of the engine in response to the setting of either the first or second alarms.

6. The method of claim 1 wherein the transport refrigeration unit includes a suction line modulation valve, and including the step of closing the suction line modulation valve prior to starting the engine.

7. The method of claim 1 wherein the control circuit includes a timer, a battery and an alternator, and the engine includes a starter for cranking the engine, a low oil pressure switch, means for driving the alternator, and an engine speed sensor, and including the steps of:

detecting engine speed during the cranking thereof, timing the cranking of the engine, determining if the engine oil pressure is low, determining if the battery is being charged by the alternator, detecting failure of the engine speed to reach a first predetermined value within a first predetermined period of time, and, in response to such a detection:

setting a first alarm indicating failure of the engine to crank when the oil pressure is low and the battery is not being charged, setting a second alarm indicating failure of the low oil pressure switch when the oil pressure is low and the battery is being charged, and setting a third alarm indicating failure of the engine speed sensor when the oil pressure is not low and the battery is being charged.

8. The method of claim 7 including the steps of:

detecting failure of the engine speed to reach a second predetermined value, which is higher than the first predetermined value, within a second predetermined period of time, which is greater than the first predetermined period of time, and, in response to such a detection:

setting a fourth alarm indicating failure of the engine to start, when the oil pressure is low and the battery is not being charged, setting the second alarm indicating failure of the low oil pressure switch, when the oil pressure is low and the battery is being charged, and setting the third alarm indicating failure of the engine speed sensor when the oil pressure is not low and the battery is being charged.

9. The method of claim 1 wherein the engine is turned off during a null cycle, and including steps of:

determining if a requested null cycle will be entered from a heat cycle or a cool cycle, and initiating a heat cycle for a predetermined short period of time prior to entering a requested null cycle, to warm the evaporator coil, when the determining step finds a requested null cycle will be entered from a cooling cycle.

10. A method of operating a transport refrigeration unit which includes microprocessor based electrical control for controlling the temperature of a conditioned space via heating, cooling and null cycles, and a refrigerant circuit which includes a compressor, a condenser, and an evaporator, and including a prime mover arrangement for driving the compressor which includes an internal combustion engine, and a starting circuit for the internal combustion engine which includes a battery, with the internal combustion engine being automatically started and stopped by the electrical control in response to predetermined conditions, comprising the steps of:

sensing the temperature of the engine prior to each start thereof, pre-heating the engine electrically via a pre-heat circuit which includes the battery, prior to each start thereof, providing a DC shunt disposed to measure battery current, reading the magnitude of the battery electrical current via the DC shunt, with said reading step being initiated a predetermined period of time after the pre-heating step if initiated, comparing the magnitude of the electrical current reading with a predetermined value, and terminating the pre-heating step in response to the comparing step when the magnitude of the electrical current reading exceeds the predetermined value.

11. The method of claim 10 wherein the refrigerant circuit includes a suction line modulation valve, and including the step of closing the suction line modulation valve prior to starting the engine.

12. A method of operating a transport refrigeration unit which includes microprocessor based electrical control for controlling the temperature of a conditioned space via heating, cooling and null cycles, and a refrigerant circuit which includes a compressor, a condenser, and an evaporator, and including a prime mover arrangement for driving the compressor which includes an internal combustion engine which is automatically started and stopped by the electrical control in response to predetermined conditions, comprising the steps of:

sensing the temperature of the engine prior to each start thereof, pre-heating the engine electrically prior to each start thereof, measuring the magnitude of the resulting current flow a predetermined period of time after the pre-heating step is initiated, determining if the measured current magnitude is within a predetermined normal range, setting an alarm when the measured current magnitude is not within the predetermined range, determining if the measured current magnitude exceeds a predetermined value when the measured current is not within the predetermined range, and terminating the pre-heat step in response to a determination that the measured current magnitude exceeds the predetermined value.

13. The method of claim 12 wherein the refrigerant circuit includes a suction line modulation valve, and including the step of closing the suction line modulation valve prior to starting the engine.

14. A method of operating a transport refrigeration unit which includes microprocessor based electrical control for controlling the temperature of a conditioned space via heating, cooling and null cycles, with the control circuit including a high pressure cut-out switch having first and second sides connected in a control circuit in which voltage is applied to the high pressure cut-out switch via a predetermined relay, with the high pressure cut-out switch being closed until pressure exceeds a predetermined value, and a refrigerant circuit which includes a compressor, a condenser, and an evaporator, and including a prime mover arrangement for driving the compressor which includes an internal combustion engine which is automatically started and stopped by the electrical control in response to predetermined conditions, comprising the steps of:

detecting the voltage level on each side of the high pressure cut-out switch during the process of starting the internal combustion engine, setting a first alarm indicating high refrigerant pressure, in response to detecting voltage on only one side of the high pressure cut-out switch, setting a second alarm indicating failure of the predetermined relay in response to absence of voltage on either side of the high pressure cut-out switch, and terminating the starting of the engine in response to the setting of either the first or second alarms.

15. The method of claim 14 wherein the refrigerant circuit includes a suction line modulation valve, and including the step of closing the suction line modulation valve prior to starting the engine.

16. A method of operating a transport refrigeration unit which includes a control circuit for controlling the temperature of a conditioned space via heating, cooling and null cycles, with the control circuit including a timer, a battery and an alternator, and a refrigerant circuit which includes a compressor, a condenser, and an evaporator, and including a prime mover arrangement for driving the compressor which includes an internal combustion engine which is automatically started and stopped by the control circuit in response to predetermined conditions, with the engine including a starter for cranking the engine, a low oil pressure switch, means for driving the alternator, and an engine speed sensor, comprising the steps of:

detecting engine speed during the cranking thereof, timing the cranking of the engine, determining if the engine oil pressure is low, determining if the battery is being charged by the alternator, detecting failure of the engine speed to reach a first predetermined value within a first predetermined period of time, and, in response to such a detection:

setting a first alarm indicating failure of the engine to crank when the oil pressure is low and the battery is not being charged, setting a second alarm indicating failure of the low oil pressure switch when the oil pressure is low and the battery is being charged, and setting a third alarm indicating failure of the engine speed sensor when the oil pressure is not low and the battery is being charged.

17. The method of claim 16 including the steps of:

detecting failure of the engine speed to reach a second predetermined value, which is higher than the first predetermined value, within a second predetermined period of time, which is greater than the first predetermined period of time, and, in response to such a detection:

setting a fourth alarm indicating failure of the engine to start, when the oil pressure is low and the battery is not being charged, setting the second alarm indicating failure of the low oil pressure switch, when the oil pressure is low and the battery is being charged, and setting the third alarm indicating failure of the engine speed sensor when the oil pressure is not low and the battery is being charged.

18. The method of claim 16 wherein the refrigerant circuit includes a suction line modulation valve, and including the step of closing the suction line modulation valve prior to starting the engine.

19. A method of starting an internal combustion engine which is connected to drive a refrigerant compressor which is connected in a closed refrigerant circuit having a condenser, an evaporator, and a controllable suction line modulation valve, comprising the steps of:

closing the suction line modulation valve, selecting an engine pre-heat time responsive to engine temperature, pre-heating the engine electrically for the selected pre-heat time, measuring the pre-heat current, setting the pre-heat time elapsed when the measuring step indicates the pre-heat current exceeds a predetermined value, checking the refrigerant circuit for excessive pressure, and cranking the engine after the pre-heat time elapses and the checking step indicates the refrigerant pressure is not excessive.

20. The method of claim 19 wherein the compressor includes a high pressure cut-out switch having first and second sides connected in a control circuit, and the step of checking the refrigerant circuit for excessive pressure includes the steps of:

detecting the voltage level on both sides of the high pressure cut-out switch, and enabling the cranking step only when voltage is detected on both sides of the high pressure cut-out switch.

* * * * *